United States Patent
Ohmori et al.

(10) Patent No.: US 8,354,198 B2
(45) Date of Patent: Jan. 15, 2013

(54) ELECTROCHEMICAL DEVICE INCLUDING A BINDING LAYER HAVING A SPINEL-TYPE CRYSTAL STRUCTURE

(75) Inventors: Makoto Ohmori, Nagoya (JP); Toshiyuki Nakamura, Nagoya (JP); Takashi Ryu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 427 days.

(21) Appl. No.: 12/645,528

(22) Filed: Dec. 23, 2009

(65) Prior Publication Data

US 2010/0196795 A1 Aug. 5, 2010

(30) Foreign Application Priority Data

Feb. 4, 2009 (JP) .................... 2009-023956
Aug. 20, 2009 (JP) .................... 2009-190655
Oct. 21, 2009 (JP) .................... 2009-242686

(51) Int. Cl.
*H01M 8/10* (2006.01)
*H01M 8/12* (2006.01)

(52) U.S. Cl. ......... 429/479; 429/482; 429/489; 429/517

(58) Field of Classification Search .............. 429/456, 429/489, 517, 535, 479, 482; 29/623.1, 623.5; 427/117; 524/403; 204/242, 270
See application file for complete search history.

(56) References Cited

U.S. PATENT DOCUMENTS

| | | | | |
|---|---|---|---|---|
| 5,132,352 A | * | 7/1992 | Richards et al. | 524/403 |
| 5,750,279 A | * | 5/1998 | Carolan et al. | 429/456 |
| 6,074,772 A | | 6/2000 | Hofer et al. | |
| 6,737,186 B2 | | 5/2004 | Janousek et al. | |
| 2007/0111069 A1 | * | 5/2007 | Rehg et al. | 429/32 |
| 2007/0231593 A1 | | 10/2007 | Ryu et al. | |

FOREIGN PATENT DOCUMENTS

| | | |
|---|---|---|
| EP | 1 263 067 A2 | 12/2002 |
| EP | 1 786 056 A1 | 5/2007 |
| JP | 11-509361 A1 | 8/1999 |
| JP | 2005-050636 A1 | 2/2005 |
| JP | 2005-339904 A1 | 12/2005 |
| JP | 2007-265896 A1 | 10/2007 |
| WO | 97/28572 A1 | 8/1997 |

OTHER PUBLICATIONS

"Electrical Conductivity and Thermal Expansion of Spinels at Elevated Temperatures", Petric et al., J. Am. Ceram. Soc., 90[5], 1515-1520, 2007.*
"Lanthanum Chromite-Based Interconnects as Key Materials for SOFC Stack Development", Sakai et al., Int. J. Appl. Ceram. Tech, 1[1], 23-30, 2004.*

* cited by examiner

*Primary Examiner* — Basia Ridley
*Assistant Examiner* — Kenneth Douyette
(74) *Attorney, Agent, or Firm* — Burr & Brown

(57) ABSTRACT

The present invention provides an electrochemical device including electrodes of an electrochemical cell and conductive connection members, wherein sufficient bonding strength is achieved between each of the electrodes and the corresponding conductive connection member through thermal treatment carried out at a temperature lower than 1,000° C. The electrochemical cell includes a solid electrolyte membrane and a pair of electrodes provided on the electrolyte membrane. The conductive connection members are electrically connected to the respective electrodes by means of a bonding layer. The bonding layer contains a transition metal oxide having a spinel-type crystal structure.

7 Claims, 19 Drawing Sheets

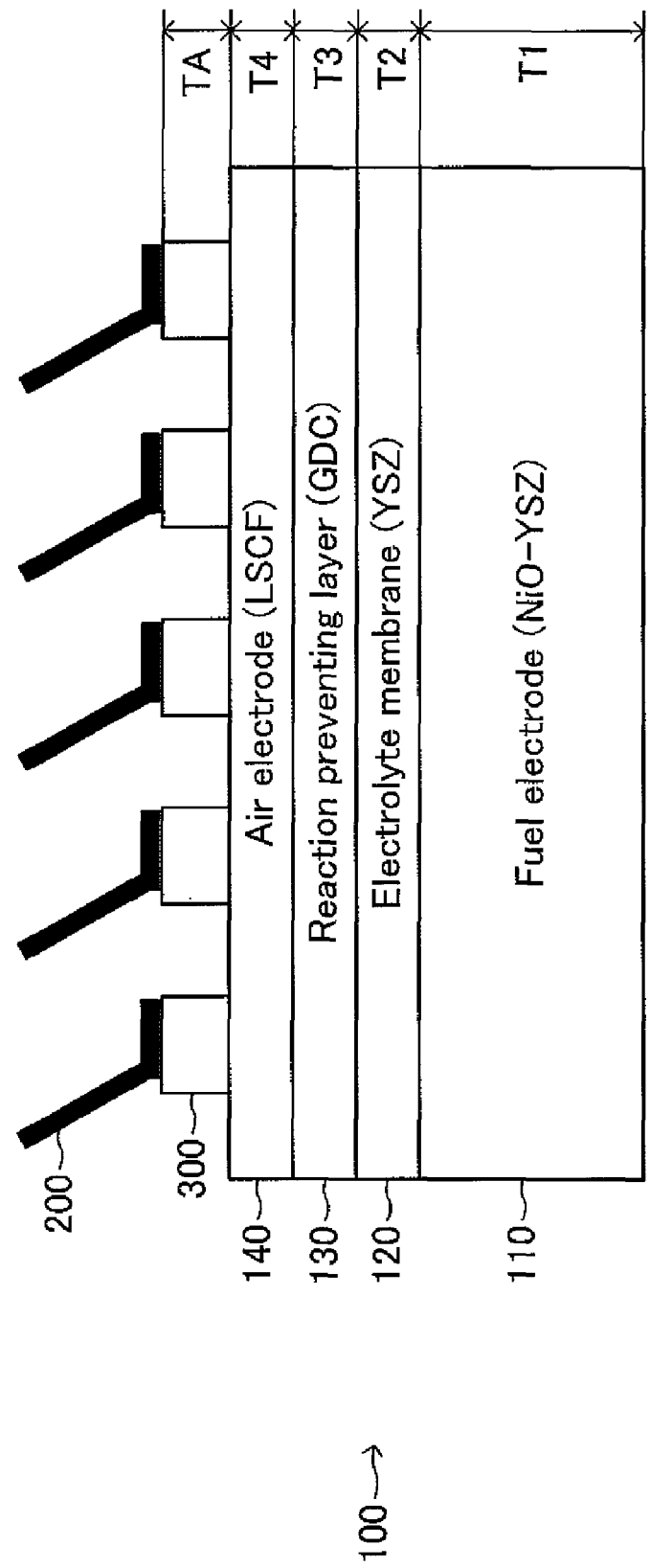

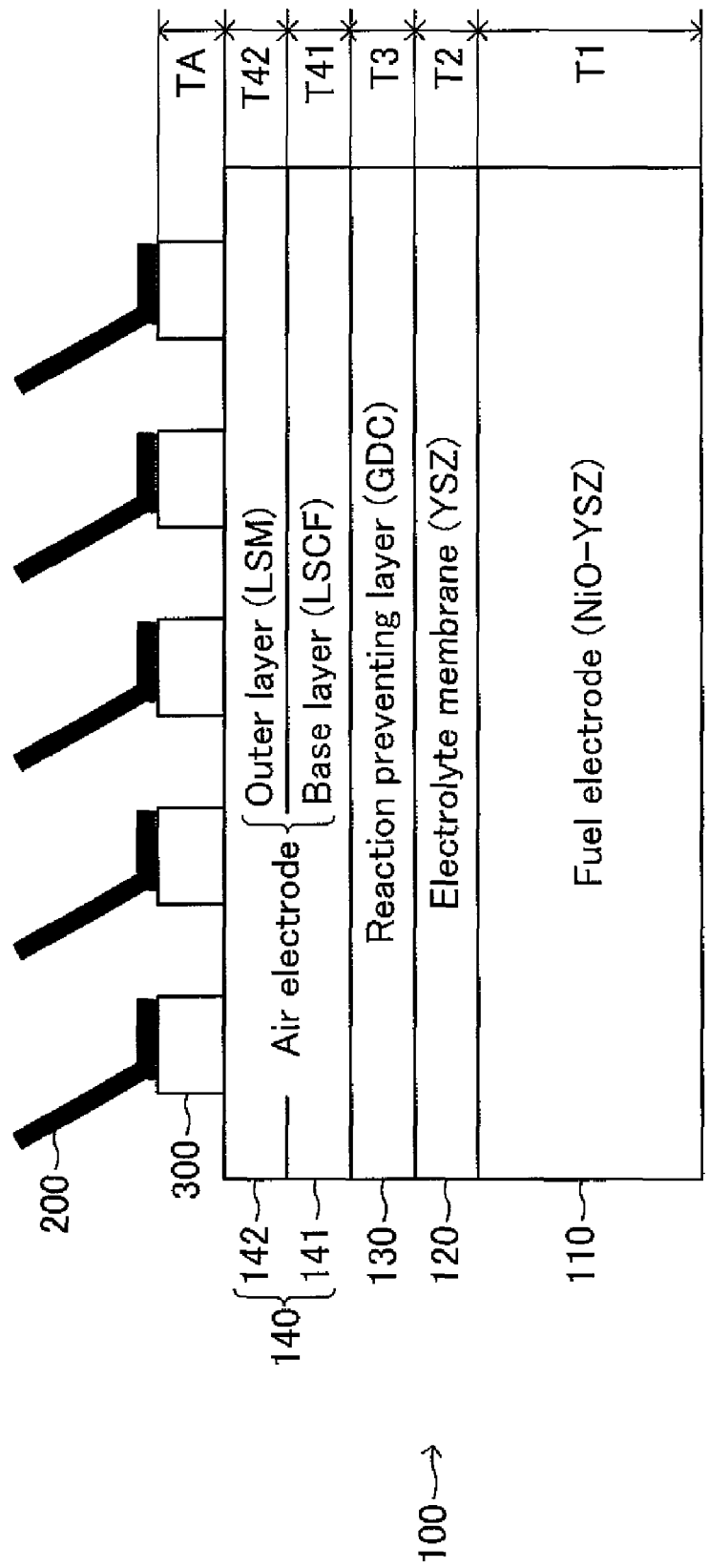

ELECTROCHEMICAL DEVICE INCLUDING A BINDING LAYER HAVING A SPINEL-TYPE CRYSTAL STRUCTURE

DESCRIPTION OF RELATED ART

1. Field of the Invention

The present invention relates to an electrochemical device such as a solid oxide fuel cell.

2. Background Art

In a cell having a stacked structure formed by stacking separators and electrochemical cells, a gas must be caused to pass between a separator and a unit cell of a solid electrolyte fuel cell, to thereby supply a fuel and an oxidizing agent to the electrodes of the unit cell. In addition, a conductive connection member (interconnector) must be provided between the separator and the unit cell so that the unit cell and the separator are electrically connected in series. When such a conductive connection member is provided on, for example, a fuel gas passage, the member must exhibit resistance to a reducing fuel gas at a temperature at which the unit cell is operated. Furthermore, a clearance through which a fuel gas can be passed must be provided. For these reasons, so-called nickel felt has generally been used for the connection member in the fuel gas passage.

However, under application of pressure to nickel felt, there is a tendency that the gas passage is impeded, and power generation performance is reduced. In order to solve such a problem, the present applicant has disclosed a technique in which elongated tongue-like portions are formed by cutting a metal mesh, and the tongue-like portions are brought into pressure contact with the electrodes of an electrochemical cell for electrical conduction (see Japanese Patent Application Laid-Open (kokai) No. 2007-265896). This technique can secure good gas passage, and can achieve a uniform load onto the electrochemical cell.

In such a cell stack, desirably, an air electrode and a fuel electrode of a unit cell are bonded to a conductive connection member, so as to increase the strength of the bonding portion and to attain stable electrical conduction. However, since the conductive connection member is generally formed of a heat-resistant metal having a high melting point, and the electrodes are formed of a ceramic material having relatively high conductivity, generally, difficulty is encountered in attaining high mechanical strength by bonding these different types of materials at 1,000° C. or lower.

Japanese Patent Application Laid-Open (kokai) No. 2005-339904 discloses a technique for strongly bonding an interconnector to a unit cell by use of a conductive ceramic material; specifically, a La—Sr—Co—Fe perovskite composite oxide.

Japanese Patent Application Laid-Open (kokai) No. 2005-50636 describes that a contact material for an air electrode is formed from a mixture of silver powder/silver alloy and perovskite composite oxide powder.

However, the bonding layer described in Japanese Patent Application Laid-Open (kokai) No. 2005-339904 requires thermal treatment at a high temperature of 1,000° C. or higher for achieving sufficient bonding strength. When thermal treatment is carried out at such a high temperature, a metallic interconnector is oxidized, and the resistance thereof increases. In contrast, when thermal treatment is carried out at, for example, 800 to 900° C. for preventing oxidation of the metallic interconnector, the bonding layer is insufficiently sintered, and thus desired bonding strength may fail to be attained, and breakage may occur at the bonding portion during operation of the unit cell.

The bonding layer described in Japanese Patent Application Laid-Open (kokai) No. 2005-50636 realizes improvement of sinterability at low temperature, and suppression of an increase in resistance of a metallic interconnector due to its oxidation. However, the bonding layer, which uses silver (i.e., expensive material), poses a problem in terms of high cost.

SUMMARY OF THE INVENTION

An object of the present invention is to attain sufficient bonding strength between an electrode of an electrochemical cell and a conductive connection member through thermal treatment carried out at a temperature lower than 1,000° C.

The present invention provides an electrochemical device comprising:

an electrochemical cell including a solid electrolyte membrane, and a pair of electrodes provided on the solid electrolyte membrane;

a pair of conductive connection members electrically connected to the respective electrodes; and a bonding layer for bonding each of the electrodes to the corresponding conductive connection member, wherein the bonding layer contains a transition metal oxide having a spinel-type crystal structure.

The present invention has been accomplished on the basis of the finding that sufficiently high bonding strength is attained between an electrode of an electrochemical cell and a conductive connection member even through thermal treatment at a temperature lower than 1,000° C. According to the present invention, an increase in cost for forming a bonding layer can be suppressed.

In Japanese Patent Application Laid-Open (kokai) No. 2005-339904 or 2005-50636, the bonding layer employs a selected perovskite composite oxide (i.e., ceramic material), since the ceramic material is similar to the material used in an air electrode (i.e., perovskite composite oxide such as lanthanum manganite), and exhibits relatively high conductivity. However, in the case of a transition metal composite oxide having a spinel structure, grain growth occurs at low temperature, and interparticle necks are likely to be formed, as compared with the case of a perovskite composite oxide. The bonding layer of the present invention has an electrical resistance slightly higher than that of a perovskite composite oxide, but the electrical resistance is at a level that causes no problem in practice.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which:

FIG. 4 is a schematic representation of an electrochemical device according to the first embodiment;

FIG. 5 is a schematic representation of an electrochemical device according to the second embodiment;

DETAILED DESCRIPTION OF THE INVENTION

Electrochemical Cell

Figure 1:
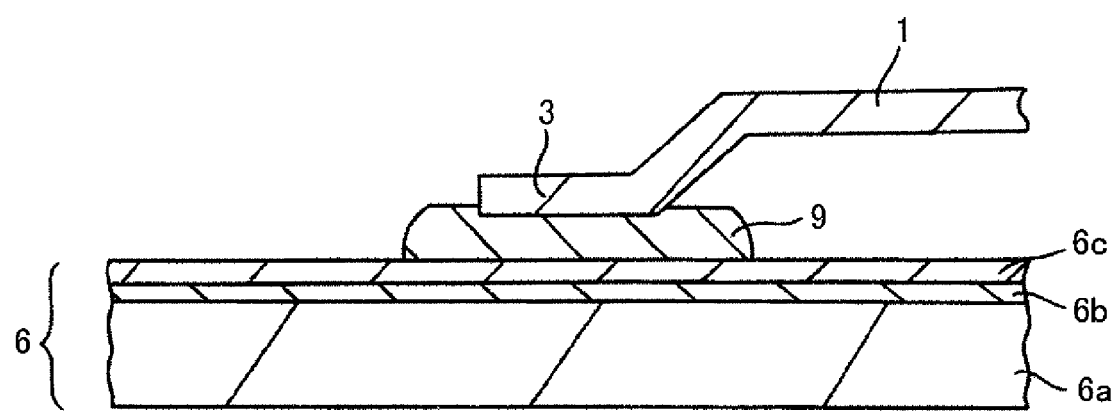
FIG. 1 is an enlarged cross-sectional view of the bonding portion between an electrode 6c and an interconnector of a unit cell 6.

As used herein, "electrochemical cell" refers to a cell for performing electrochemical reaction. For example, the electrochemical cell is an oxygen pump or a high-temperature steam electrolysis cell. The high-temperature steam electrolysis cell may be employed in a hydrogen production device or a steam removal device. The electrochemical cell may be employed as an NOx or SOx decomposition cell. This decomposition cell may be employed as a device for purifying exhaust gas discharged from an automobile or an electric power generator. In this case, oxygen contained in exhaust gas can be removed by causing the gas to pass through a solid electrolyte membrane. In addition, NOx can be electrolyzed into nitrogen and oxygen, and the thus-generated oxygen can be removed. Together with this process, water vapor contained in the exhaust gas is electrolyzed into hydrogen and oxygen, and the thus-generated hydrogen reduces NOx into $N_2$. In a preferred embodiment, the electrochemical cell is a solid electrolyte fuel cell.

The pair of electrodes are an anode and a cathode. One of feed gases may be a reducing gas, and the other gas may be an oxidizing gas.

No particular limitation is imposed on the material of the solid electrolyte membrane, and the material may be yttria-stabilized zirconia or yttria-partially-stabilized zirconia. When the electrochemical cell is an NOx decomposition cell, cerium oxide is preferably employed.

The material of the cathode is preferably a lanthanum-containing perovskite composite oxide, more preferably lanthanum manganite or lanthanum cobaltite, much more preferably lanthanum manganite. The material of the cathode may be lanthanum cobaltite or lanthanum manganite doped with, for example, strontium, calcium, chromium, cobalt, iron, nickel, or aluminum. The material of the cathode may be palladium, platinum, ruthenium, platinum-zirconia cermet, palladium-zirconia cermet, ruthenium-zirconia cermet, platinum-cerium oxide cermet, palladium-cerium oxide cermet, or ruthenium-cerium oxide cermet.

The material of the anode is preferably, for example, nickel, palladium, platinum, nickel-zirconia cermet, platinum-zirconia cermet, palladium-zirconia cermet, nickel-cerium oxide cermet, platinum-cerium oxide cermet, palladium-cerium oxide cermet, ruthenium, or ruthenium-zirconia cermet.

A separator may be provided between electrochemical cells. In this case, no particular limitation is imposed on the material of the separator, so long as the material is stable with respect to one of the feed gases and the other gas. However, the material of the separator is preferably, for example, a lanthanum-containing perovskite composite oxide, more preferably lanthanum chromite. When a metallic separator is employed, the material thereof is a nickel-based alloy such as inconel or nichrome, a cobalt-based alloy such as Haynes alloy, or an iron-based alloy such as stainless steel. Examples of the material stable with respect to a reducing gas include nickel and a nickel-based alloy. Examples of the metallic separator used in a solid oxide fuel cell operated at 1,000° C. or lower include ZMG232L (trade name, product of Hitachi Metals, Ltd.).

(Conductive Connection Member)

In the present invention, the material of the conductive connection member must be stable with respect to a gas to which the member is exposed at a temperature at which the electrochemical cell is operated. Specific examples of preferred materials include platinum, silver, gold, palladium, a nickel-based alloy (e.g., inconel or nichrome), a cobalt-based alloy (e.g., Haynes alloy), an iron-based alloy (e.g., stainless steel), and nickel.

(Bonding Layer)

The bonding layer contains a transition metal oxide having a spinel-type crystal structure.

An oxide having a spinel structure is represented by the compositional formula $AB_2O_4$, and the spinel-type crystal structure include two sites; i.e., A-site and B-site. A crystal having a spinel structure belongs to the isometric system and has an octahedral form.

In the present invention, each of the metal elements occupying the A-site and B-site of the oxide having a spinel structure is selected from among transition metals. The transition metals are preferably the following: chromium, manganese, iron, cobalt, nickel, copper, and zinc.

Preferably, each of the metal elements occupying the A-site and the B-site is a transition metal (exclusive of a noble metal). More preferably, the metal element occupying the A-site (hereinafter may be referred to as "metal element A") is selected from among iron, manganese, cobalt, copper, nickel, and zinc, and the metal element occupying the B-site (hereinafter may be referred to as "metal element B") is selected from among chromium, cobalt, manganese, and iron.

Particularly preferably, the metal element A is one or more species selected from the group consisting of manganese, copper, nickel, and zinc, and the metal element B is one or more species selected from the group consisting of cobalt, manganese, and iron.

A portion of the A-site or the B-site may be substituted with a doping metal element other than any of the aforementioned main metal elements. Examples of such a doping metal element include all the metal elements (except for the aforementioned main metal elements) and amphoteric elements.

When a portion of the A-site or the B-site is substituted with such a doping metal element, the amount of the doping metal element is preferably 20 mol % or less, more preferably 10 mol % or less.

The bonding layer employed in the present invention exhibits a desired conductivity; specifically, 1 S/cm to 500 S/cm at 700° C. to 1,000° C.

(Cell Stack)

No particular limitation is imposed on the electrochemical cell stack to which the present invention is applied. An example of such a cell stack will now be described with reference to FIGS. 1 and 2. As shown in FIG. 1, an electrochemical cell 6 includes an air electrode 6c, a solid electrolyte membrane 6b, and a fuel electrode 6a. The fuel electrode and the air electrode may be interchanged with each other. The cell 6 and conductive connection members 1 are sandwiched between a metallic air electrode interconnector 5A and a fuel electrode interconnector 5B, to thereby form a cell stack.

In this case, the conductive connection members 1, which exhibit gas passage property, are provided between the air electrode interconnector 5A and the cell 6, and between the fuel electrode interconnector 5B and the cell 6. As shown in FIG. 1, a tip end portion 3 of each of the conductive connection members 1 is bonded to the electrode 6a or 6c of the cell 6 by means of a bonding layer 9 of the present invention, whereby the conductive connection members are fixed to the cell, and electrical conduction is achieved.

(Production Method for Cell Stack)

Firstly, the electrochemical cell 6 is produced from a ceramic material. No particular limitation is imposed on the method for producing the cell. Subsequently, the material of the bonding layer of the present invention is provided between each electrode of the cell 6 and the conductive connection member 1 for bonding the electrode to the connection member. The cell 6 and the conductive connection members are sandwiched between the interconnectors 5A and 5B, and a cell stack is formed under application of pressure. Thereafter, the cell stack is heated in a hydrogen atmosphere, to thereby reduce the fuel electrode so that electric power can be generated. No particular limitation is imposed on the pressure application mechanism, and the mechanism may be, for example, a fastening member (e.g., bolt) or a biasing mechanism (e.g., spring).

Any of the following methods may be employed for bonding the conductive connection member 1 to each of the electrodes 6a and 6c of the cell 6.

(1) A paste containing powder of a spinel composite oxide is provided between each electrode of the cell and the corresponding conductive connection member so that the paste comes into contact with both the electrode and the connection member. The resultant product is heated, to thereby produce the bonding layer 9 containing the spinel composite oxide and to bond the connection member to the electrode of the cell.

(2) An oxide of a metal element A and an oxide of a metal element B are mixed in proportions corresponding to a spinel composite oxide, to thereby prepare a powder mixture. A paste containing the powder mixture is provided between each electrode of the cell and the corresponding conductive connection member so that the paste comes into contact with both the electrode and the connection member. The resultant product is heated, to thereby produce the bonding layer 9 containing the spinel composite oxide and to bond the connection member to the electrode of the cell.

(3) Powder of a metal element A and powder of a metal element B are mixed in proportions corresponding to a spinel composite oxide, to thereby prepare a powder mixture. A paste containing the powder mixture is provided between each electrode of the cell and the corresponding conductive connection member so that the paste comes into contact with both the electrode and the connection member. The resultant product is heated, to thereby produce the bonding layer 9 containing the spinel composite oxide and to bond the connection member to the electrode of the cell.

The step of heating for producing the conductive bonding layer is preferably carried out at 500° C. or higher, more preferably at 700° C. or higher, from the viewpoint of attainment of the bonding strength required for the electrochemical cell stack. From the viewpoint of prevention of degradation, due to oxidation, of a metallic separator or the conductive connection member, the heating step is preferably carried out at 980° C. or lower, more preferably at 900° C. or lower.

The heating step for producing the conductive bonding layer may be carried out in an air atmosphere or a reducing atmosphere. However, more preferably, the heating step is carried out in an air atmosphere.

The paste for producing the conductive bonding layer may optionally contain a binder, a solvent, or an additional additive.

Examples of the binder include methylcellulose, ethylcellulose, polyvinyl alcohol (PVA), and polyvinyl butyral (PVB).

Examples of the solvent include ethanol, butanol, terpineol, acetone, xylene, and toluene.

Examples of the additional additive include a dispersant and a plasticizer.

EXAMPLES

Evaluation of Bonding Strength

Figure 3A:
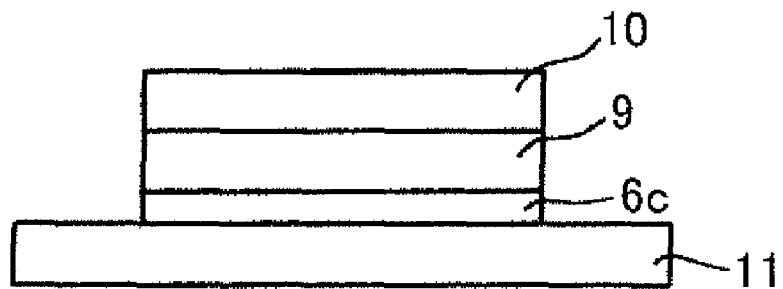
FIG. 3A is a front view of a bonded product produced through bonding of an air electrode disk to a metallic disk.
Figure 3B:
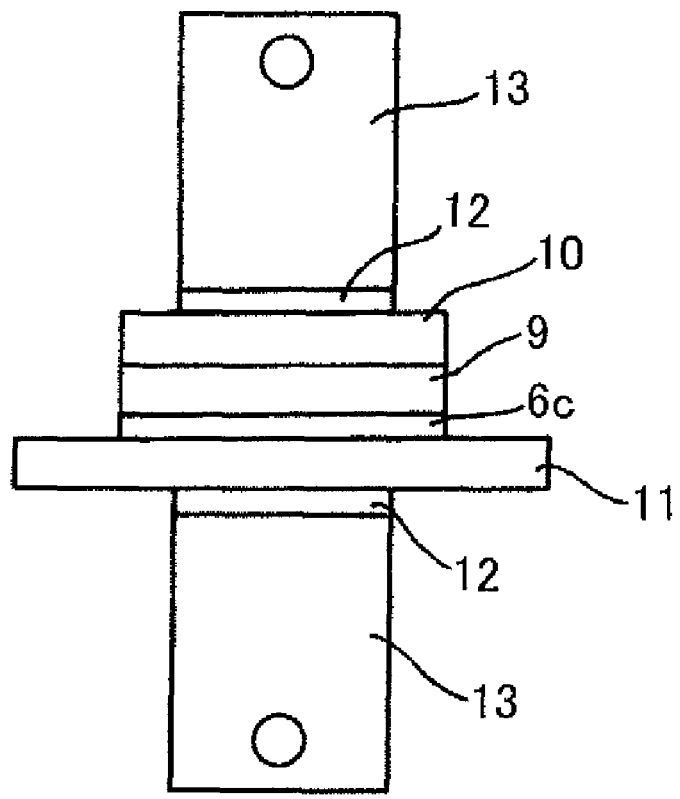
FIG. 3B is a front view of a jig for measuring the bonding strength of the bonded product of FIG. 3A.

Assemblies shown in FIGS. 3A and 3B were employed for evaluation of the bonding strength between a cell electrode and a conductive bonding layer of each of Examples and Comparative Example.

(Production of Bonding Paste)

Powder of an oxide of transition metal 1 and powder of an oxide of transition metal 2 were weighed so as to attain a ratio by mole shown in Table 1, and these powders were mixed and milled by means of a pot mill for 24 hours, to thereby prepare a slurry. The thus-prepared slurry was dried in an oven at 80° C. and then fired in an air atmosphere at 800° C. for one hour, to thereby synthesize a spinel composite oxide. The thus-synthesized spinel composite oxide was milled by means of a pot mill, to thereby produce composite oxide powder having a mean particle size of 0.5 μm. The powder was mixed with ethylcellulose serving as a binder and terpineol serving as a solvent, to thereby produce a bonding paste.

Powder of transition metal 1 and powder of transition metal 2 were weighed so as to attain a ratio by mole shown in Table 1, and these powders were mixed with ethylcellulose serving as a binder and terpineol serving as a solvent in a mortar, to thereby produce a bonding paste.

TABLE 1

| Example | Transition metal 1 | Transition metal 2 | Transition metal 1: Transition metal 2 (by mole) | Chemical formula of spinel |
|---|---|---|---|---|
| 1 | Mn | Co | 1:2 | $MnCo_2O_4$ |
| 2 | Cu | Mn | 1:2 | $CuMn_2O_4$ |
| 3 | Ni | Mn | 1:2 | $NiMn_2O_4$ |
| 4 | Ni | Fe | 1:2 | $NiFe_2O_4$ |
| 5 | Zn | Fe | 1:2 | $ZnFe_2O_4$ |

In Comparative Example, $La_{0.6}Sr_{0.4}Co_{0.2}Fe_{0.8}O_3$ having a mean particle size of 0.5 μm was mixed with ethylcellulose serving as a binder and terpineol serving as a solvent, to thereby produce a bonding paste. $La_{0.6}Sr_{0.4}Co_{0.2}Fe_{0.8}O_3$ is a material which is often used for forming an air electrode of a fuel cell and which is sintered at a relatively low temperature.

(Production of Air Electrode Disk for Testing)

$La_{0.75}Sr_{0.2}MnO_3$, which is used for forming an air electrode of a fuel cell, was subjected to molding by means of a uniaxial press, and the resultant product was fired in air at 1,200° C. for two hours, to thereby produce a compact. The compact was processed into a disk 11 for testing (φ: 20 mm, thickness: 2 mm) (FIG. 3A).

For simulation of an air electrode of a practical fuel cell, $La_{0.75}Sr_{0.2}MnO_3$ powder having a mean particle size of 0.5 μm and 8 mol % yttria-stabilized zirconia powder were mixed at a ratio by weight of 1:1, and the resultant mixture was mixed with ethylcellulose serving as a binder and terpineol serving as a solvent, to thereby prepare a paste. The paste was applied (φ: 10 mm), through printing, to a surface of the above-formed disk for an air electrode, and the paste-applied disk was fired in air at 1,200° C. for one hour, to thereby form a simulated air electrode 6c.

(Production of Metal Disk)

A ferrite stainless steel material having a high Cr content (22% Cr) was processed into a metal disk 10 (φ: 10 mm, thickness: 0.5 mm).

(Production of Test Sample)

The bonding paste 9 was applied to a surface of the air electrode 6c formed on the disk 11 and to a surface of the metal disk 10, and the paste-applied air electrode 6c and the paste-applied metal disk 10 were attached to each other, followed by drying at 100° C. for one hour. Thereafter, the resultant product was fired in air at 900° C. for one hour, to thereby bond the air electrode 6c to the metal disk 10 for formation of a test sample (bonded product) (FIG. 3A).

(Evaluation Method)

For determination of the bonding strength of the bonded product, as shown in FIG. 3B, metallic jigs 13 were bonded to the air electrode disk 11 and the metal disk 10 by means of an adhesive 12, and then tensile testing was carried out. In each of the Examples, bonded products (n=5) were tested, and the thus-determined bonding strengths of the products were averaged. The results are shown in Table 2.

TABLE 2

| | Starting material | Average strength (MPa) |
|---|---|---|
| Example 1 | Oxide powder | 11 |
| | Metal powder | 52 |
| Example 2 | Oxide powder | 9 |
| | Metal powder | 43 |
| Example 3 | Oxide powder | 8 |
| | Metal powder | 49 |
| Example 4 | Oxide powder | 9 |
| | Metal powder | 41 |
| Example 5 | Oxide powder | 10 |
| | Metal powder | 54 |
| Comparative Example | — | 3.2 |

In each of Examples 1 to 5, in which a spinel material was employed, the bonding strength between the electrode and the metal disk was considerably improved, as compared with the case where $La_{0.6}Sr_{0.4}Co_{0.2}Fe_{0.8}O_3$, which is a conventional perovskite material, was employed. These data indicate that the present invention realizes stronger bonding between a metallic interconnector and an electrode.

[Power Generation Test]

Figure 2:
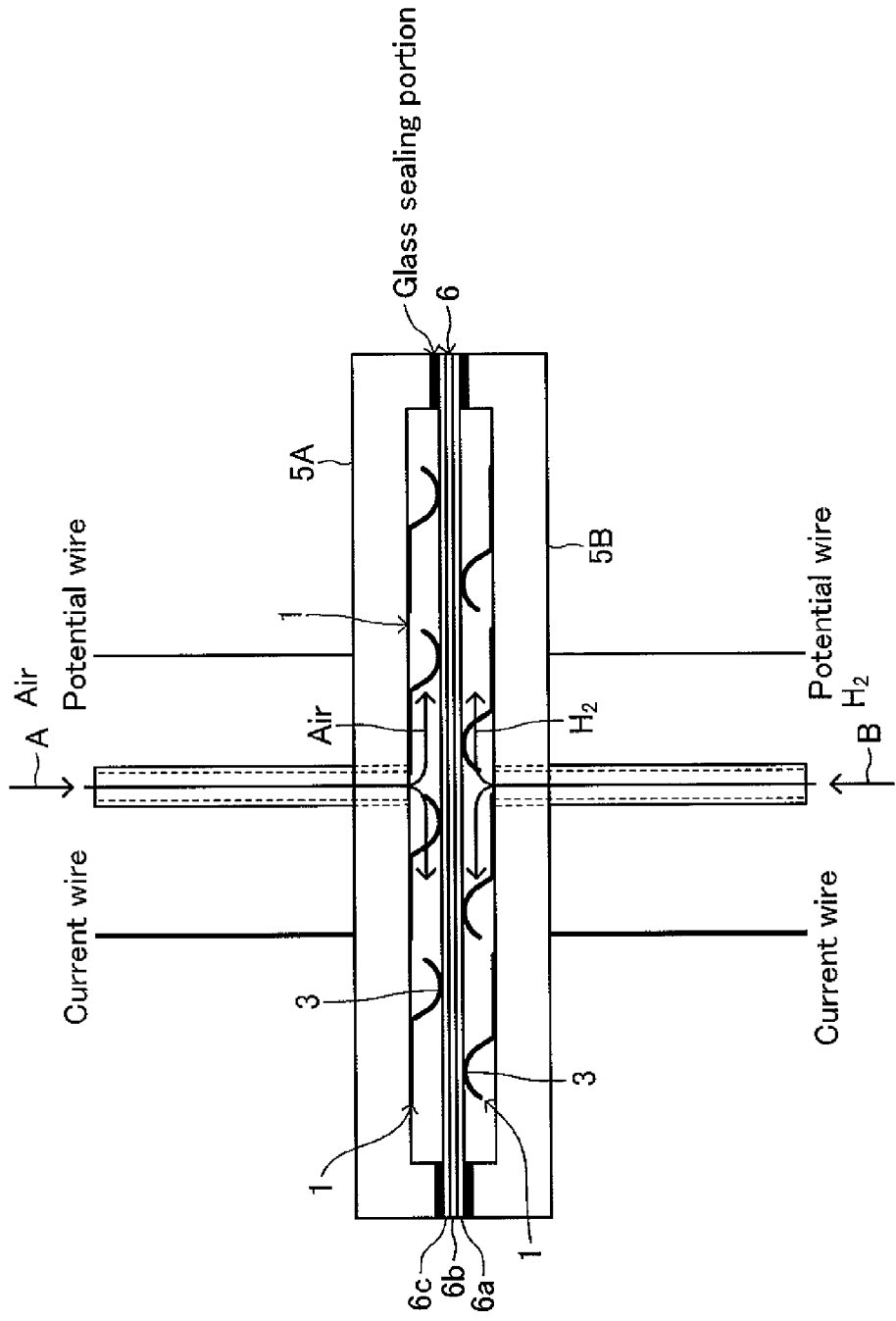
FIG. 2 is a schematic representation of an electric power generator employing an electrochemical cell.

As schematically shown in FIG. 2, a solid oxide fuel cell including a fuel electrode serving as a substrate was produced.

(Production of Fuel Electrode Substrate)

Nickel oxide powder having a mean particle size of 1 μm (50 parts by weight) was mixed with yttria-stabilized zirconia (8YSZ, TZ-8Y: product of Tosoh Corporation) (50 parts by weight), and the resultant mixture was mixed with polyvinyl alcohol (PVA) serving as a binder, to thereby prepare a slurry. The slurry was dried with a spray dryer, followed by granulation, to thereby produce powder for a fuel electrode substrate. The thus-produced powder was formed, through die pressing molding, into a disk having a diameter of 120 mm and a thickness of 1.5 mm. Thereafter, the disk was fired by means of an electric furnace in air at 1,400° C. for three hours, to thereby produce a fuel electrode substrate 6a.

(Formation of Solid Electrolyte Membrane)

Water and a binder were added to and mixed with 8 mol % yttria-stabilized zirconia powder by means of a ball mill for 16 hours. The resultant slurry was applied to the aforementioned fuel electrode substrate and then dried, followed by co-sintering by means of an electric furnace in air at 1,400° C. for two hours, to thereby produce a sintered compact of fuel electrode/solid electrolyte membrane (electrolyte membrane thickness: 10 μm).

(Formation of Air Electrode)

For formation of an air electrode, $La_{0.75}Sr_{0.2}MnO_3$ powder having a mean particle size of 0.5 μm and 8 mol % yttria-stabilized zirconia powder were mixed at a ratio by weight of 1:1, and the resultant mixture was mixed with ethylcellulose and terpineol serving as a solvent, to thereby prepare a paste. The paste was applied, through screen printing, to the electrolyte membrane so as to form a film, and then dried, followed by firing at 1,200° C. for one hour, to thereby produce a unit cell 6 including the fuel electrode 6a/the solid electrolyte membrane 6b/the air electrode 6c.

(Production of Conductive Connection Member)

A conductive connection member 1 having gas passage property on the side of the fuel electrode was formed of an Ni mesh, and a conductive connection member 1 having gas passage property on the side of the air electrode was formed of a ferrite stainless steel mesh. Each of these meshes was subjected to laser processing, and the thus-cut portions were formed into protrusions (tongue-like portions) through pressing. The height of the thus-formed tongue-like portions 3 was regulated to 1.0 mm so as to correct warpage of the unit cell.

(Bonding)

The bonding paste produced in Example 1 was applied to the surface of the air electrode 6c of the above-produced unit cell 6 and to the tongue-like portions 3 of the conductive connection member 1, and the tongue-like portions 3 were attached to the air electrode 6c. Also, the bonding paste produced in Example 1 was applied to a surface of an interconnector 5A, and the interconnector 5A was bonded to the conductive connection member 1. An Ni paste was applied to the surface of the fuel electrode 6a of the unit cell 6 and to a surface of an interconnector 5B, and the fuel electrode 6a was attached to the interconnector 5B via the conductive connection member 1 sandwiched therebetween. Thereafter, drying was carried out at 100° C. for one hour, and then firing was carried out in air at 900° C. for one hour, to thereby produce a cell stack through bonding of the aforementioned components. In Comparative Example, a bonding paste was produced by mixing $La_{0.6}Sr_{0.4}Co_{0.2}Fe_{0.8}O_3$ having a mean particle size of 0.5 μm with ethylcellulose serving as a binder and terpineol serving as a solvent. In a manner similar to that described above, firing was carried out in air at 900° C. for one hour, to thereby produce a cell stack through bonding of the aforementioned components.

(Performance Evaluation)

For performance evaluation, the above-produced cell stack was placed into an electric furnace, and the cell stack was heated to 800° C. while nitrogen gas was caused to flow on the side of the fuel electrode 6a and air was caused to flow on the side of the air electrode 6c. At the time when the temperature of the cell stack reached 800° C., hydrogen gas was caused to flow on the side of the fuel electrode 6a, to thereby perform a reduction treatment for three hours. Thereafter, the current-voltage characteristics of the cell stack were evaluated, and the internal resistance thereof was analyzed.

As a result, the cell stack employing the conductive bonding layer of the present invention was found to have a maximum power density of 0.31 W/cm$^2$ and an ohmic resistance of 0.30 Ω·cm$^2$. In contrast, the cell stack employing the conductive bonding layer of the Comparative Example was found to have a maximum power density of 0.10 W/cm$^2$ and an ohmic resistance of 2.0 Ω·cm$^2$.

These data indicate that, as compared with the case of $La_{0.6}Sr_{0.4}Co_{0.2}Fe_{0.8}O_3$, which is a conventional perovskite material, the present invention realizes stronger bonding between a metallic interconnector and an electrode, and also realizes improvement of power generation output and reduction in internal ohmic resistance.

(Bonding Between Air Electrode of Solid Oxide Fuel Cell and Interconnector)

A unit cell of a solid oxide fuel cell (SOFC) includes a solid electrolyte membrane, a fuel electrode integral with the solid electrolyte membrane, and an air electrode integral with the solid electrolyte membrane. In the unit cell of the SOFC, when a fuel gas (e.g., hydrogen gas) is supplied to the fuel electrode, and an oxygen-containing gas (e.g., air) is supplied to the air electrode, chemical reactions shown in the following formulas (1) and (2) occur. Thus, a potential difference is generated between the fuel electrode and the air electrode. This potential difference is based on the oxygen ion conductivity of the solid electrolyte membrane.

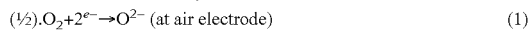

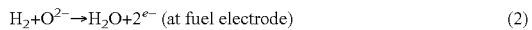

In the SOFC, generally, a conductive connection member (hereinafter may be referred to as an "interconnector") for power collection is bonded and fixed to each of the fuel electrode and the air electrode by means of a bonding layer, and electric power based on the aforementioned potential difference is externally extracted through the interconnector. The following description is focused particularly on bonding between an air electrode and an interconnector.

Hitherto, an expensive Pt material has been used for bonding an air electrode to an interconnector, thereby electrically connecting the air electrode to the interconnector. From the viewpoint of cost reduction, such a Pt material may be replaced with a metallic material (e.g., silver material) or a ceramic material (e.g., conductive ceramic material). As described above, the present inventors have paid attention to a conductive ceramic material; specifically, a transition metal oxide having a spinel-type crystal structure (e.g., $MnCo_2O_4$ or $CuMn_2O_4$).

When such a spinel material is employed for a bonding layer, a precursor of the bonding layer (i.e., a paste) is provided between a bonding portion of the air electrode and a bonding portion of the interconnector, and the paste is fired. Thus, the air electrode and the interconnector are bonded and electrically connected by means of the bonding layer (i.e., sintered compact). The interconnector connected to the air electrode is generally formed from, for example, a ferrite SUS material. When a ferrite SUS material is employed at high temperature, chromia ($Cr_2O_3$) is easily formed on the surface of the material through oxidation. Chromia ($Cr_2O_3$) has very high electrical resistance.

Therefore, when a chromia ($Cr_2O_3$) film is formed at the interface between the interconnector and the bonding layer, and growth of the chromia ($Cr_2O_3$) film proceeds, the entire SOFC exhibits increased electrical resistance, and is likely to output low electric power. The higher the temperature at which a ferrite SUS material is employed, the more easily chromia ($Cr_2O_3$) is formed. Thus, in order to prevent formation of chromia ($Cr_2O_3$) at the interface between the bonding layer and the interconnector during firing of the paste (i.e., precursor of the bonding layer), the paste must be fired at a relatively low temperature.

When the paste (i.e., precursor of the bonding layer) is fired at a relatively low temperature, the bonding layer (i.e., sintered compact) must satisfy the following two requirements:

1. attainment of sufficient densification and high conductivity (low electrical resistance); and
2. attainment of high bonding strength.

From the viewpoint of enhancement of the rate of the chemical reaction shown in the aforementioned formula (1), which occurs in an air electrode of an SOFC, effectively, the air electrode is formed from, for example, highly active lanthanum strontium cobalt ferrite (LSCF). Thus, there may be proposed a configuration in which an air electrode is formed only of an LSCF layer, and the LSCF layer is bonded to an interconnector by means of a bonding layer containing a spinel material (as used herein, the configuration may be referred to as "the first embodiment"). The present inventors have developed a configuration in which the bonding strength between an air electrode and a bonding layer is higher than that in the case of the first embodiment (as used herein, the thus-developed configuration may be referred to as "the second embodiment"). These configurations will be described below.

FIG. 4 shows an electrochemical device according to the first embodiment including a unit cell 100 of an SOFC, and an interconnector 200, wherein the unit cell 100 includes an air electrode 140 formed only of an LSCF layer, and the LSCF layer of the unit cell 100 is bonded to the interconnector 200. As shown in FIG. 4, in the first embodiment, the unit cell 100 is a layered product including a fuel electrode 110, an electrolyte membrane 120 stacked on the fuel electrode 110, a reaction preventing layer 130 stacked on the electrolyte membrane 120, and the air electrode 140 stacked on the reaction preventing layer 130. As viewed from above, the unit cell 100 is in the form of square (each side: 1 to 10 cm), rectangle (longer side: 5 to 30 cm, shorter side: 3 to 15 cm), or circle (diameter: 10 cm).

The fuel electrode 110 (anode) is a porous, plate-like fired product formed of nickel oxide (MO) and yttria-stabilized zirconia (YSZ). The fuel electrode 110 was produced as follows. Specifically, NiO powder (60 parts by weight) was mixed with YSZ powder (40 parts by weight), and the resultant mixture was mixed with polyvinyl alcohol (PVA) serving as a binder, to thereby prepare a slurry. The slurry was dried with a spray dryer, followed by granulation, to thereby produce powder for the fuel electrode. The powder was subjected to die pressing molding, and then the resultant product was fired by means of an electric furnace in air at 1,400° C. for three hours. Thus, the fuel electrode 110 was produced. The fuel electrode 110 has a thickness T1 of 0.3 to 3 mm. Among the members constituting the unit cell 100, the fuel electrode 110 has the largest thickness. The fuel electrode 110 also serves as a support substrate of the unit cell 100.

The electrolyte membrane 120 is a dense, thin plate-like fired product formed of YSZ. The electrolyte membrane 120 was formed on the fuel electrode 110 as follows. Specifically, water and a binder were added to and mixed with YSZ powder in a ball mill for 24 hours, to thereby prepare a slurry. The slurry was applied to the fuel electrode 110 and then dried, followed by co-sintering by means of an electric furnace in air at 1,400° C. for two hours. Thus, the electrolyte membrane 120 was formed on the fuel electrode 110. The electrolyte membrane 120 has a thickness T2 of 3 to 30 μm. Formation of a film to become the electrolyte membrane 120 on the fuel electrode 110 may be carried out through tape lamination, printing, or a similar technique.

The reaction preventing layer 130 is a dense, thin plate-like fired product formed of ceria. Specific examples of the ceria include GDC (gadolinium-doped ceria) and SDC (samarium-doped ceria). The reaction preventing layer 130 was formed on the electrolyte membrane 120 as follows. Specifically, water and a binder were added to and mixed with GDC powder in a ball mill for 24 hours, to thereby prepare a slurry. The slurry was applied to the electrolyte membrane 120 and then dried, followed by firing by means of an electric furnace in air at 1,350° C. for one hour. Thus, the reaction preventing layer 130 was formed on the electrolyte membrane 120. The reaction preventing layer 130 has a thickness T3 of 3 to 20 μm. Formation of a film to become the reaction preventing layer 130 on the electrolyte membrane 120 may be carried out through tape lamination, printing, or a similar technique. The reaction preventing layer 130 may be formed through co-sintering.

The reaction preventing layer 130 is provided between the electrolyte membrane 120 and the air electrode 140 for preventing an increase in electrical resistance between the electrolyte membrane 120 and the air electrode 140 due to reaction between YSZ contained in the electrolyte membrane 120 and strontium contained in the air electrode 140 in the unit cell 100 during operation of the SOFC.

The air electrode 140 (cathode) is a porous, thin plate-like fired product formed of lanthanum strontium cobalt ferrite (LSCF). That is, the air electrode 140 is formed only of an LSCF layer. Lanthanum strontium cobalt ferrite is represented by the following chemical formula (3):

$$La_{1-x}Sr_xCo_{1-y}Fe_yO_{3-\delta} \quad (3)$$

(wherein x is 0.05 to 0.6, more preferably 0.2 to 0.5; y is 0.5 to 0.95, more preferably 0.6 to 0.85; and δ is a small value (including zero)).

Specific examples of the composition of lanthanum strontium cobalt ferrite include $La_{0.6}Sr_{0.4}Co_{0.2}Fe_{0.8}O_3$.

The air electrode 140 was formed on the reaction preventing layer 130 as follows. Specifically, water and a binder were added to and mixed with LSCF powder in a ball mill for 24 hours, to thereby prepare a slurry. The slurry was applied to the reaction preventing layer 130 and then dried, followed by firing by means of an electric furnace in air at 1,000° C. for one hour. Thus, the air electrode 140 was formed on the reaction preventing layer 130. The air electrode 140 has a thickness T4 of 5 to 50 μm.

The interconnector 200 is a conductive connection member formed of a ferrite SUS material. The interconnector 200 was formed by processing a ferrite SUS material into a shape of interest through, for example, machining. In this embodiment, a plurality of interconnectors 200 were provided. By means of a bonding layer 300, a bonding portion of each of the interconnectors 200 is bonded and electrically connected to a bonding portion of the air electrode 140 (i.e., LSCF layer) of the unit cell 100.

The bonding layer 300 is a fired product formed of a transition metal oxide having a spinel-type crystal structure (e.g., $MnCo_2O_4$ or $CuMn_2O_4$). Bonding by means of the bonding layer 300 was achieved as follows. This bonding will now be described by taking, as an example, the case of employment of $MnCo_2O_4$. Firstly, powder of manganese (Mn) and powder of cobalt (Co) were weighed and mixed at a ratio by mole of 1:2. The mixture was mixed with ethylcellulose serving as a binder and terpineol serving as a solvent in a mortar, to thereby prepare a bonding paste. The bonding paste was applied to the surface of the air electrode 140 (i.e., LSCF layer) of the unit cell 100 and to bonding portions of the interconnectors 200, and the air electrode 140 was attached to the interconnectors 200. Thereafter, the paste was dried at 100° C. for one hour, and then fired in air at 850° C. for one hour. Thus, the bonding layer 300 (i.e., fired product) was formed. By means of the bonding layer 300, the air electrode 140 is bonded and electrically connected to the interconnectors 200. The bonding layer 300 has a thickness TA of 20 to 500 μm.

In the first embodiment, the bonding paste is prepared by using, as starting materials, metal powders forming a spinel material. However, the bonding paste may be prepared by using, as a starting material, powder of a spinel material which has been synthesized in advance. In this case, a spinel material ($MnCo_2O_4$) which has been synthesized through a predetermined procedure is milled in a pot mill, to thereby produce powder of the spinel material. The powder is mixed with ethylcellulose serving as a binder and terpineol serving as a solvent, to thereby prepare a bonding paste. The air electrode 140 is attached to the interconnectors 200 by means of the paste, and the paste is dried at 100° C. for one hour. Thereafter, the paste is fired in air at 1,000° C. for one hour. Thus, the bonding layer 300 (i.e., fired product) is formed.

In contrast to the electrochemical device shown in FIG. 4, FIG. 5 shows an electrochemical device according to the second embodiment including a unit cell 100 and an interconnector 200 bonded thereto. The electrochemical device according to the second embodiment differs from the electrochemical device according to the first embodiment in that the air electrode 140 is formed of the following two layers: a base layer 141 (LSCF layer) and an outer layer 142, and that the outer layer 142 is bonded to the interconnectors 200 by means of the bonding layer 300; i.e., in the electrochemical device according to the first embodiment, the air electrode 140 is formed only of an LSCF layer (corresponding to the base layer 141), and the LSCF layer is bonded to the interconnectors 200 by means of the bonding layer 300.

The outer layer 142 is a porous, thin plate-like fired product having a manganese-containing perovskite structure. The outer layer 142 is formed of, for example, lanthanum strontium manganite (LSM) or lanthanum manganite (LM). The substance forming the outer layer 142 is represented by the following chemical formula (4):

(4)

(wherein AE is at least one element selected from among Ca, Sr, and Ba; B is at least one element selected from among Cr, Fe, Co, and Ni; x is 0.05 to 0.4, more preferably 0.1 to 0.3; y is 0 to 0.2, more preferably 0 to 0.05; z is 0 to 0.2, more preferably 0.05 to 0.15; and $\delta$ is a small value (including zero)).

Specific examples of the composition of the substance include $La_{0.8}Sr_{0.2}MnO_3$ and $LaMnO_3$.

The outer layer 142 was formed on the base layer 141 as follows. Formation of the outer layer 142 will now be described by taking, as an example, the case of employment of LSM. Specifically, water and a binder were added to and mixed with LSM powder in a ball mill for 24 hours, to thereby prepare a slurry. The slurry was applied to the base layer 141 and then dried, followed by co-sintering by means of an electric furnace in air at 1,000° C. for one hour. Thus, the outer layer 142 was formed on the base layer 141. In the air electrode 140, the base layer 141 has a thickness T41 of 5 to 50 μm, and the outer layer 142 has a thickness T42 of 5 to 50 μm.

In the second embodiment, the base layer 141 is formed only of a single LSCF layer. However, the base layer 141 may be formed of a plurality of layers. For example, the base layer 141 may be formed of the following two layers: an LSCF layer (air electrode) stacked on the reaction preventing layer 130, and a lanthanum strontium cobaltite (LSC, $La_{0.8}Sr_{0.2}CoO_3$) layer (power collection layer) stacked on the LSCF layer (i.e., provided between the LSCF layer and the outer layer (LSM layer) 142). Furthermore, an LSCF layer (thermal stress buffer layer) may be provided between the LSC layer and the outer layer (LSM layer) 142; i.e., the base layer 141 may be formed of three layers. The material of the air electrode may be, in place of LSCF, for example, LSC, lanthanum strontium ferrite (LSF, $La_{0.8}Sr_{0.2}FeO_3$), or lanthanum nickel ferrite (LNF, $LaNi_{0.6}Fe_{0.4}O_3$).

As described above, the present inventors have found that, in the second embodiment, the bonding strength between the air electrode 140 and the bonding layer 300 is higher than that in the case of the first embodiment. Next will be described test A carried out for confirmation of this finding.

(Test A)

In test A, there were prepared a plurality of samples corresponding to the first embodiment; i.e., samples on the basis of different combinations of the material of the bonding layer 300 and the structure (material and number of layers stacked) of the air electrode 140; as well as a plurality of samples corresponding to the second embodiment; i.e., samples on the basis of different combinations of the material of the bonding layer 300 and the structure (material and number of layers stacked) of the base layer 141. Specifically, as shown in Table 3, eight combinations were provided. Five samples were prepared for each combination. In Table 3, combinations in which the aforementioned outer layer is not provided (combinations 1, 3, 5, and 7) correspond to the first embodiment, and combinations in which the aforementioned outer layer is provided (combinations 2, 4, 6, and 8) correspond to the second embodiment.

TABLE 3

| Combination | Air electrode (base layer) | Outer layer | Bonding layer |
|---|---|---|---|
| 1 | LSCF | None | $MnCo_2O_4$ |
| 2 | LSCF | LSM | $MnCo_2O_4$ |
| 3 | LSCF/LSC | None | $MnCo_2O_4$ |
| 4 | LSCF/LSC | LSM | $MnCo_2O_4$ |
| 5 | LSCF | None | $CuMn_2O_4$ |
| 6 | LSCF | LSM | $CuMn_2O_4$ |
| 7 | LSCF/LSC | None | $CuMn_2O_4$ |
| 8 | LSCF/LSC | LSM | $CuMn_2O_4$ |

Figure 6:
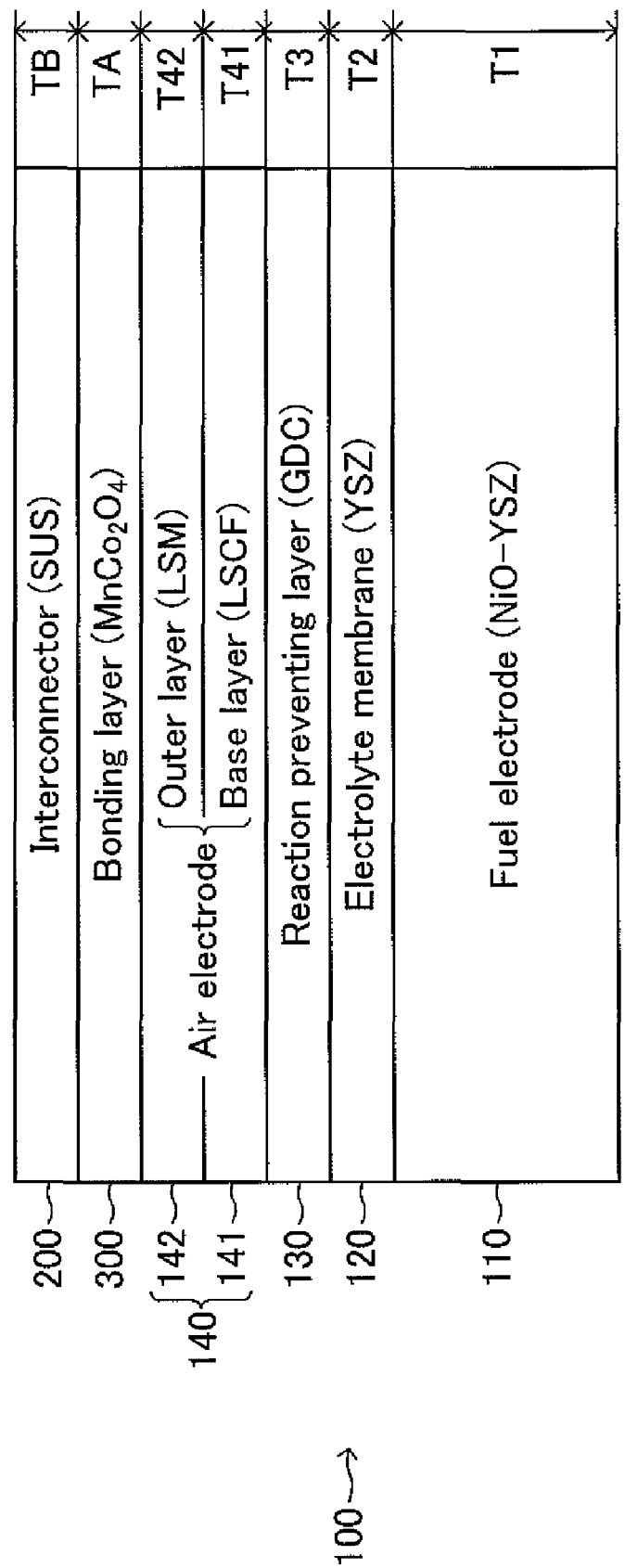
FIG. 6 is a schematic representation of the configuration of a sample for bonding strength evaluation.

As shown in FIG. 6, these samples were prepared so that the form of each of the interconnector 200 and the bonding layer 300 as viewed from above was the same as that of the unit cell 100 as viewed from above. Specifically, the air electrode 140 (outer layer 142) and the interconnector 200, which have the same form as viewed from above, are bonded at the entire bonding surfaces thereof by means of the bonding layer 300. FIG. 6 shows the configuration of a sample corresponding to the second embodiment, which configuration is similar to that of a sample corresponding to the first embodiment.

In these samples, the thicknesses of the respective components were regulated as follows: thickness T1 of the fuel electrode 110 (NiO-YSZ): 500 μm; thickness T2 of the electrolyte membrane 120 (3YSZ): 5 μm; thickness T3 of the reaction preventing layer 130 (GDC): 5 μm; thickness T4 of the air electrode 140 (LSCF) (thickness T41 of the base layer 141): 30 μm; thickness T42 of the outer layer 142 (LSM): 20 μm; thickness TA of the bonding layer 300: 200 μm; and thickness TB of the interconnector 200: 450 μm. These samples were prepared so as to have a circular form (diameter: 30 cm) as viewed from above. The outer layer 142 was formed from LSM ($La_{0.8}Sr_{0.2}MnO_3$). The bonding layer 300 was produced by using, as starting materials, metal powders forming a spinel material.

Figure 7:
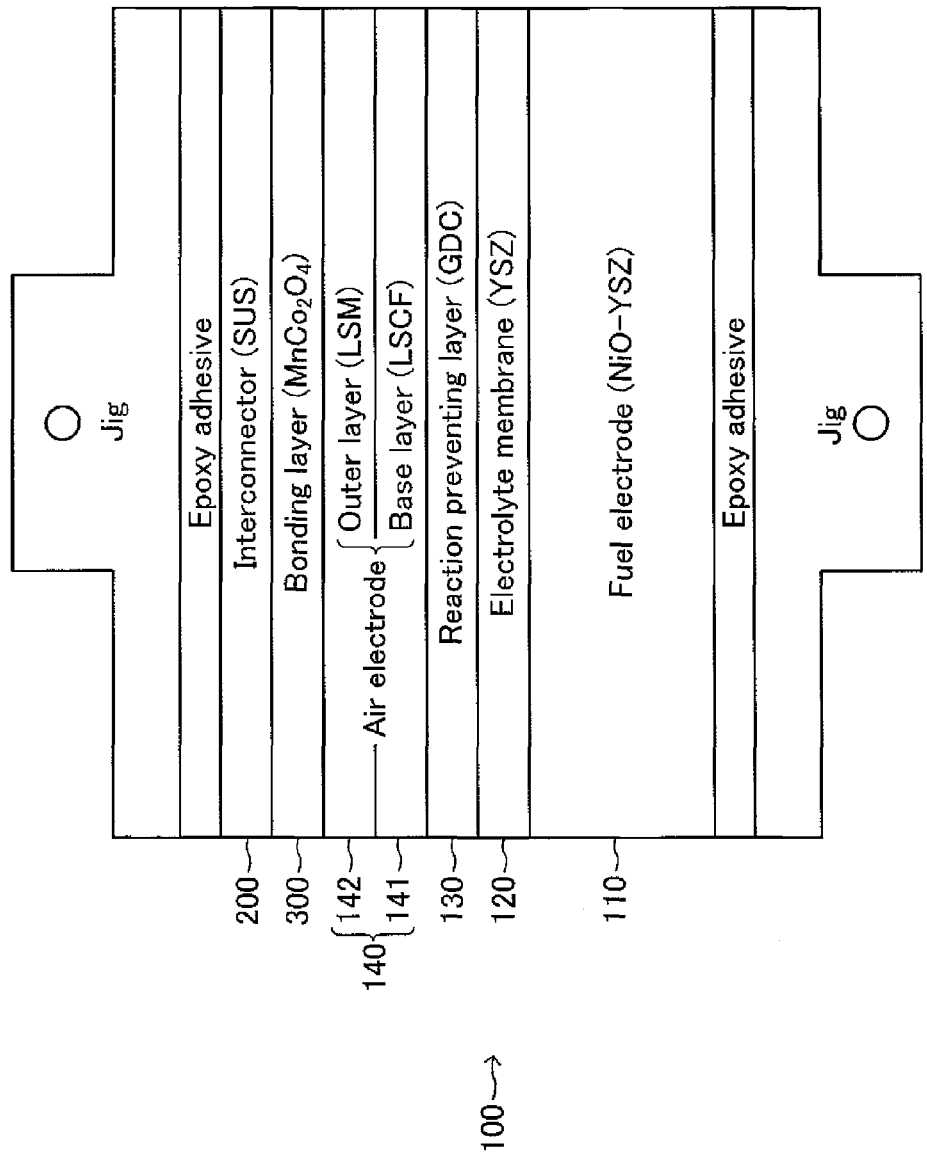
FIG. 7 is a schematic representation of the configuration of the sample of FIG. 6 when subjected to tensile testing.

As shown in FIG. 7, jigs for tensile testing were attached to the top and bottom surfaces of each sample by use of an epoxy resin. There was employed, as the epoxy resin, a thermosetting epoxy adhesive (trade name: TB2222P, product of Three-Bond Co., Ltd.) having high adhesion. Such a high-adhesion epoxy resin was employed for attaining a bonding strength higher than that at the portion of bonding by means of the bonding layer 300. Curing of the epoxy resin (i.e., bonding) was carried out at 100° C. for 60 minutes.

Tensile force was applied to each sample in a vertical direction by vertically pulling the jigs attached to the top and bottom surface of the sample. Thus, the tensile force at break of the portion of bonding by means of the bonding layer 300 (hereinafter the tensile force may be referred to as "tensile strength") was determined. In each sample, breakage occurred at the weakest bonding portion; i.e., the bonding portion between the bonding layer 300 and the air electrode 140 (the air electrode 140 in the first embodiment, or the outer layer 142 in the second embodiment). The results are shown in Table 4.

TABLE 4

| Combination | Tensile strength (unit: MPa) | | | | | Average value |
|---|---|---|---|---|---|---|
| 1 | 20 | 23 | 28 | 21 | 25 | 23.4 |
| 2 | 48 | 52 | 55 | 54 | 51 | 52 |
| 3 | 20 | 22 | 18 | 28 | 26 | 22.8 |
| 4 | 45 | 52 | 48 | 49 | 47 | 48.2 |
| 5 | 32 | 23 | 25 | 20 | 21 | 24.2 |
| 6 | 46 | 40 | 44 | 43 | 44 | 43.4 |
| 7 | 24 | 27 | 29 | 33 | 29 | 28.4 |
| 8 | 46 | 47 | 53 | 50 | 49 | 49 |

As is clear from Table 4, there is a tendency that samples corresponding to the second embodiment (presence of the outer layer 142) have a tensile strength higher than that of samples corresponding to the first embodiment (absence of the outer layer 142). These data indicate that, in the second embodiment, the bonding strength between the air electrode 140 and the bonding layer 300 is higher than that in the case of the first embodiment. No particular difference is observed in electrical resistance between samples corresponding to the first and second embodiments.

Next will be described the thickness T42 of the outer layer 142 and the thickness TA of the bonding layer. The present inventors carried out test B for determining preferred ranges of the thickness T42 of the outer layer 142 and the thickness TA of the bonding layer for securing tensile strength in the second embodiment. Test B was carried out as described below.

(Test B)

In test B, there were prepared a plurality of samples corresponding to the second embodiment; i.e., samples on the basis of different combinations of the thickness T42 of the outer layer 142 and the thickness TA of the bonding layer. Specifically, as shown in Table 5, 15 combinations were provided. Five samples (corresponding to FIG. 6) were prepared for each combination.

TABLE 5

| Combination | Thickness of outer layer (µm) | | Thickness of bonding layer (µm) | | Tensile strength (MPa) |
|---|---|---|---|---|---|
| 1 | LSM | 2 | $MnCo_2O_4$ | 200 | 24 |
| 2 | LSM | 5 | $MnCo_2O_4$ | 200 | 52 |
| 3 | LSM | 15 | $MnCo_2O_4$ | 200 | 50 |
| 4 | LSM | 24 | $MnCo_2O_4$ | 200 | 48 |
| 5 | LSM | 35 | $MnCo_2O_4$ | 200 | 53 |
| 6 | LSM | 40 | $MnCo_2O_4$ | 200 | 56 |
| 7 | LSM | 50 | $MnCo_2O_4$ | 200 | 45 |
| 8 | LSM | 60 | $MnCo_2O_4$ | 200 | 32 |
| 9 | LSM | 20 | $MnCo_2O_4$ | 10 | 8 |
| 10 | LSM | 20 | $MnCo_2O_4$ | 20 | 46 |
| 11 | LSM | 20 | $MnCo_2O_4$ | 50 | 54 |
| 12 | LSM | 20 | $MnCo_2O_4$ | 150 | 51 |
| 13 | LSM | 20 | $MnCo_2O_4$ | 300 | 45 |
| 14 | LSM | 20 | $MnCo_2O_4$ | 500 | 47 |
| 15 | LSM | 20 | $MnCo_2O_4$ | 700 | 25 |

In these samples, the thicknesses of the respective components were regulated as follows: thickness T1 of the fuel electrode 110 (NiO—YSZ): 500 µm; thickness T2 of the electrolyte membrane 120 (3YSZ): 5 µm; thickness T3 of the reaction preventing layer 130 (GDC): 5 µm; thickness T41 of the base layer 141 of the air electrode 140: 30 µm; and thickness TB of the interconnector 200: 450 µm. These samples were prepared so as to have a circular form (diameter: 30 cm) as viewed from above. The outer layer 142 was formed from LSM ($La_{0.8}Sr_{0.2}MnO_3$). The bonding layer 300 was produced by using, as starting materials, metal powders forming a spinel material. $MnCo_2O_4$ was employed as the spinel material (it has been confirmed that employment of $CuMn_2O_4$ results in similar effects).

In a manner similar to that in test A, as shown in FIG. 7, jigs for tensile testing were attached to the top and bottom surfaces of each sample by use of an epoxy resin (bonding conditions were the same as those in test A). Thereafter, tensile strength was determined through the same procedure as in test A. In each sample, breakage occurred at the weakest bonding portion; i.e., the bonding portion between the outer layer 142 and the bonding layer 300. The results are shown in Table 5. The tensile strength of each combination shown in Table 5 is the average of the tensile strengths of the corresponding five samples.

As is clear from Table 5, from the viewpoint of securement of tensile strength, the thickness T42 of the outer layer 142 is preferably 5 to 50 µm, and the thickness TA of the bonding layer is preferably 20 to 500 µm.

(Characteristic Features of Bonding Portion Between Air Electrode and Bonding Layer)

Figure 8:
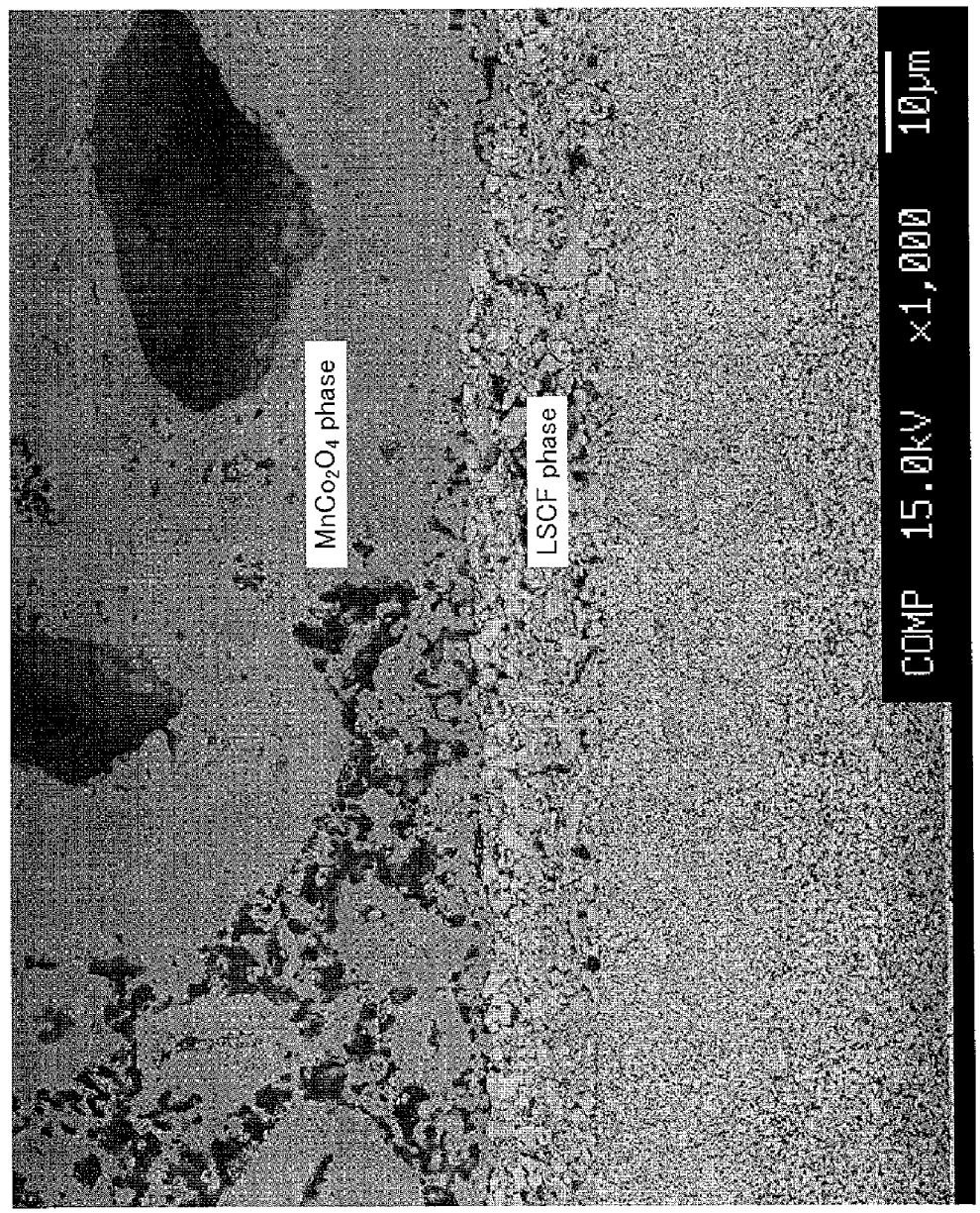
FIG. 8 is a field emission electron probe microanalysis image (magnification: ×1,000) of a cross section in the vicinity of the bonding portion between an air electrode and a bonding layer in the first embodiment.
Figure 9:
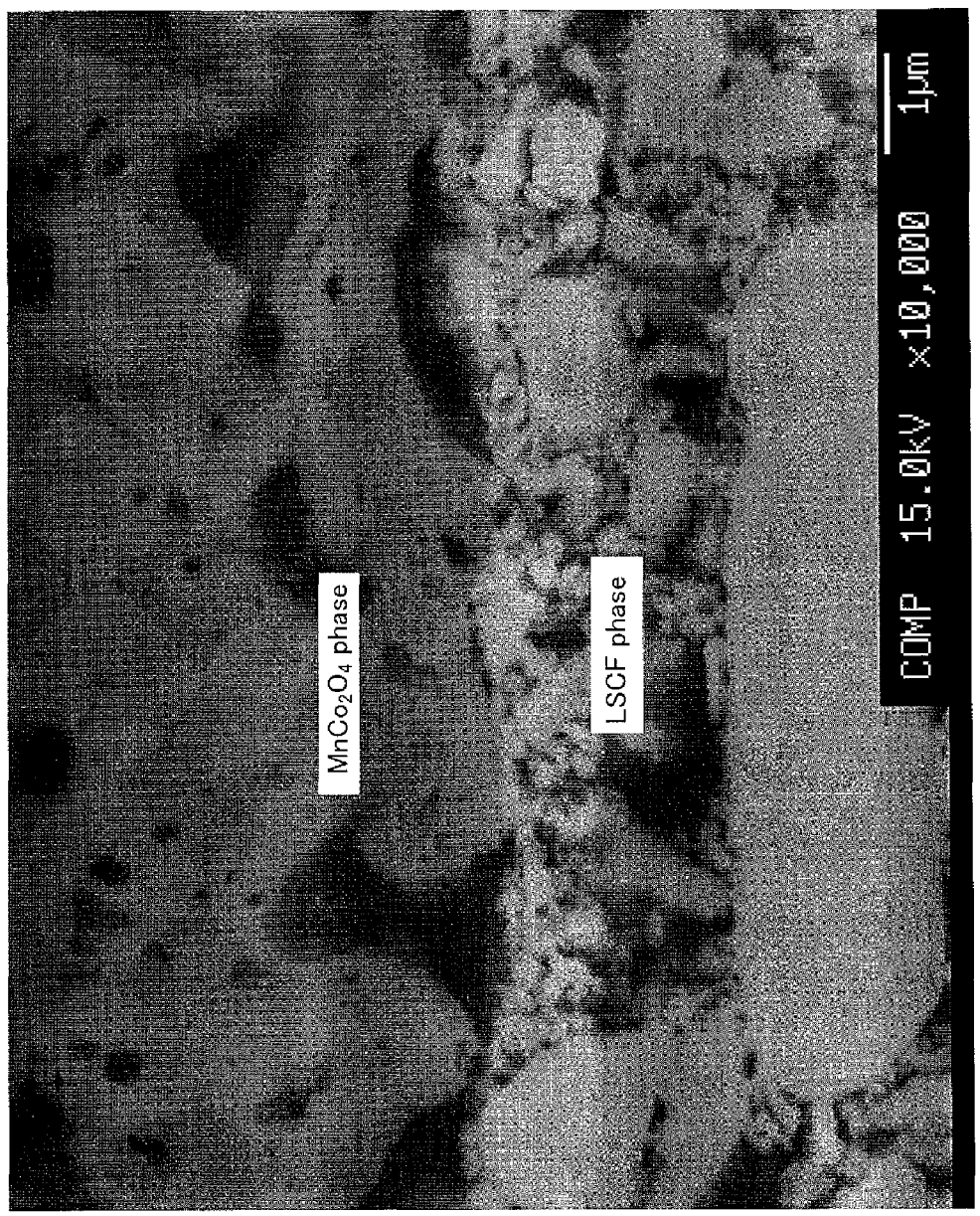
FIG. 9 is a field emission electron probe microanalysis image (magnification: ×10,000) of a cross section in the vicinity of the bonding portion between the air electrode and the bonding layer in the first embodiment.
Figure 10:
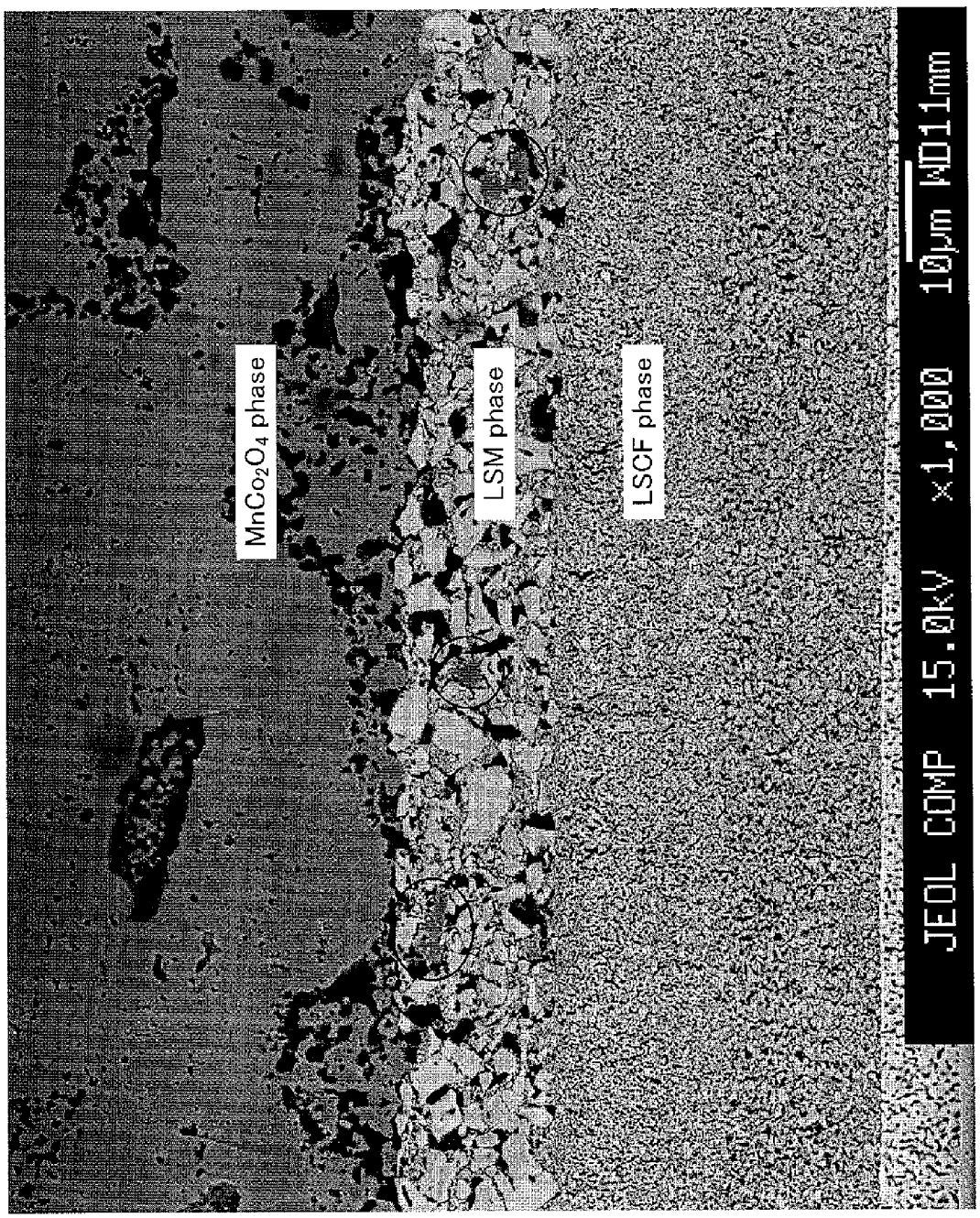
FIG. 10 is a field emission electron probe microanalysis image (magnification: ×1,000) of a cross section in the vicinity of the bonding portion between an air electrode and a bonding layer in the second embodiment.
Figure 11:
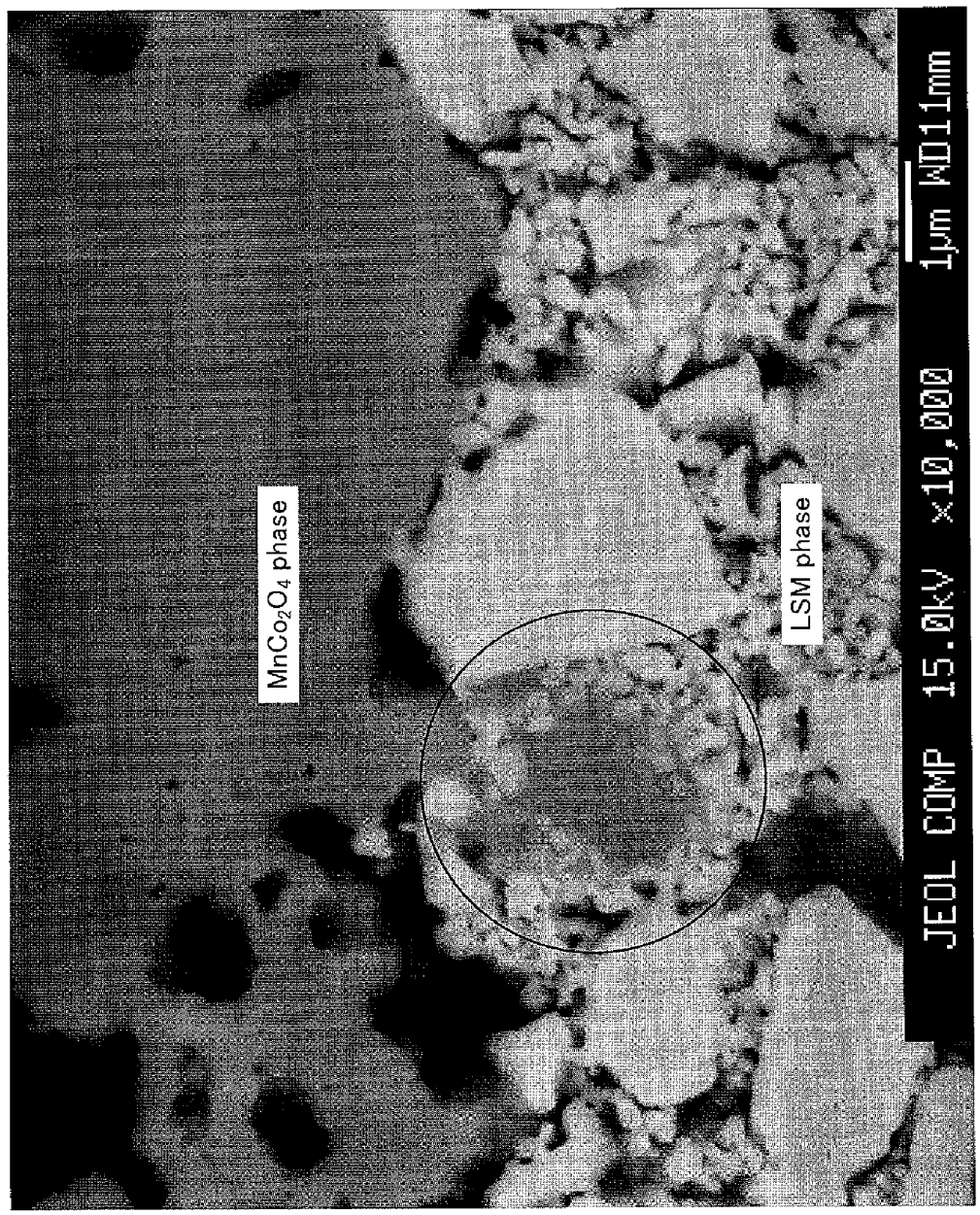
FIG. 11 is a field emission electron probe microanalysis image (magnification: ×10,000) of a cross section in the vicinity of the bonding portion between the air electrode and the bonding layer in the second embodiment.

Next will be described characteristic features of the bonding portion (bonding region) between the air electrode 140 and the bonding layer 300. FIGS. 8 and 9 are respectively field emission electron probe microanalysis (FE-EPMA) images (magnification: ×1,000 and ×10,000) of a cross section in the vicinity of the bonding portion between the air electrode 140 (LSCF phase) and the bonding layer 300 ($MnCo_2O_4$ phase) in the first embodiment. FIGS. 10 and 11 are respectively field emission electron probe microanalysis (FE-EPMA) images (magnification: ×1,000 and ×10,000) of a cross section in the vicinity of the bonding portion between the outer layer 142 (LSM phase) of the air electrode and the bonding layer 300 ($MnCo_2O_4$ phase) in the second embodiment.

As shown by circles in FIGS. 10 and 11, in the second embodiment, a phase formed through reaction between the $MnCo_2O_4$ phase and the LSM phase (hereinafter the phase may be referred to as "reaction phase") is observed at the bonding portion between the outer layer 142 (LSM phase) and the bonding layer ($MnCo_2O_4$ phase) on the side of the outer layer 142 (LSM phase). As shown in FIG. 10, this reaction phase is also observed in the interior of the LSM phase.

Figure 12:
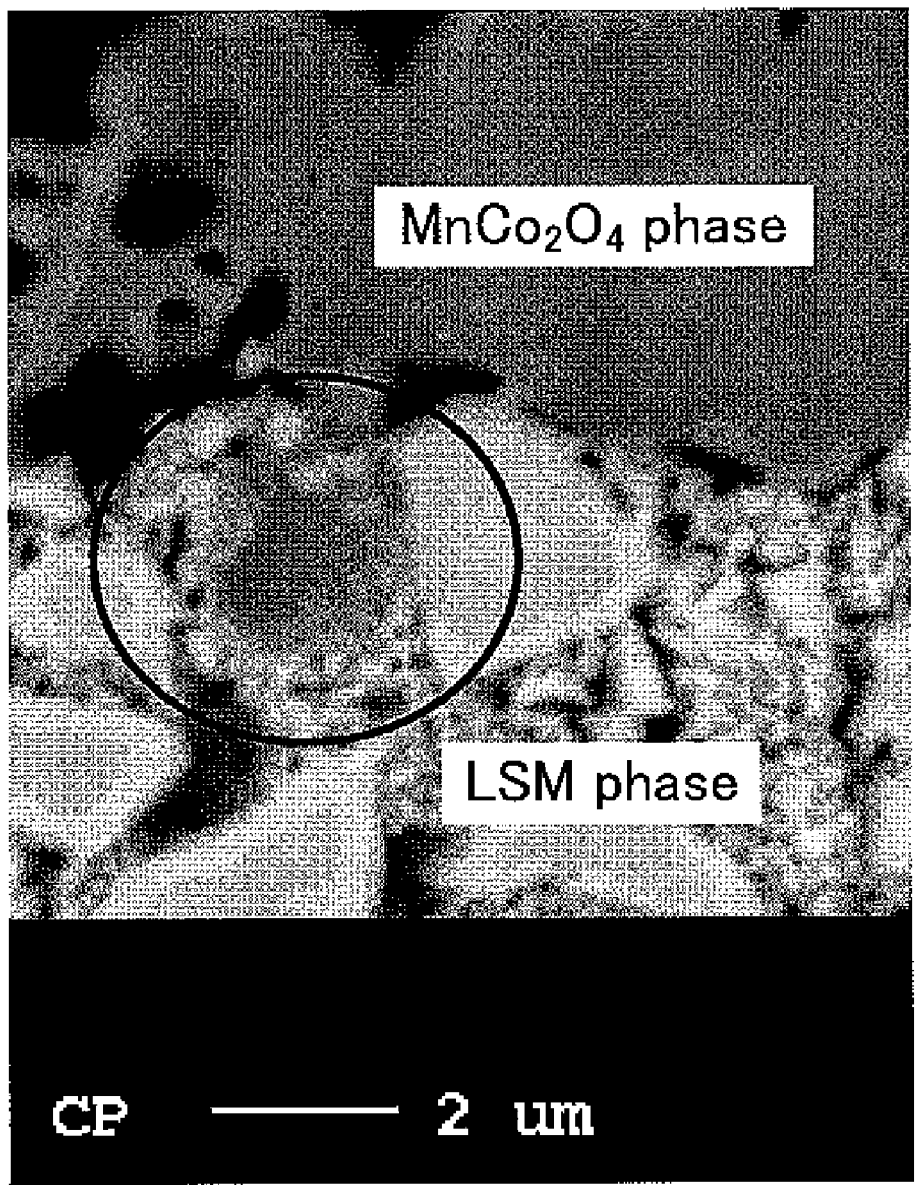
FIG. 12 shows a portion of the image of FIG. 11 including a reaction phase.
Figure 13:
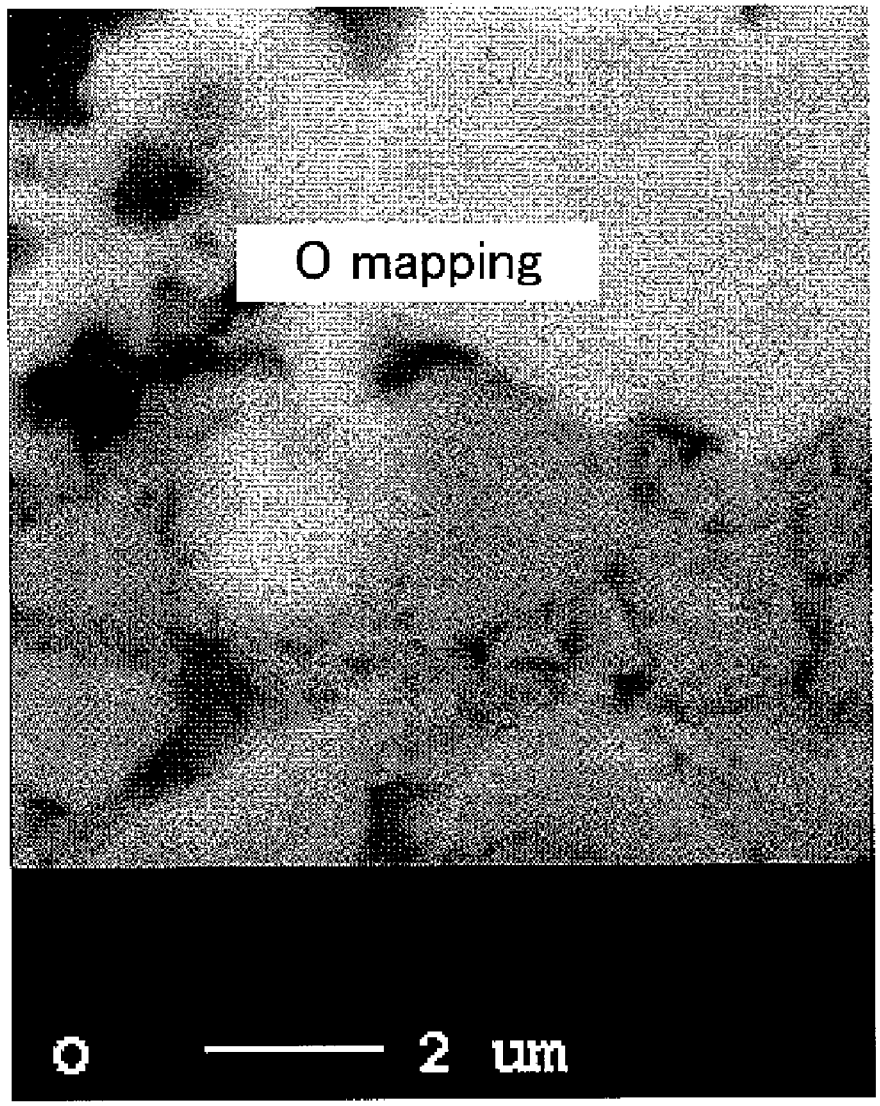
FIG. 13 is an image showing the results of oxygen mapping of the portion corresponding to the image of FIG. 12.
Figure 14:
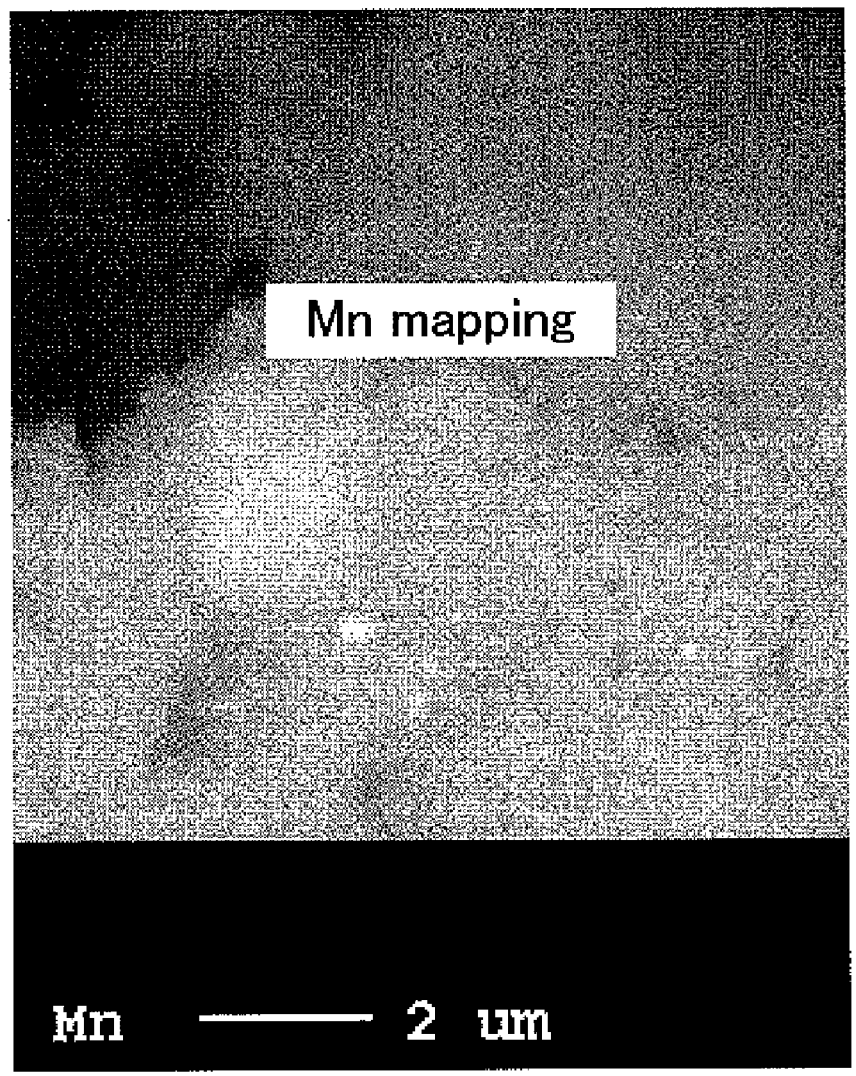
FIG. 14 is an image showing the results of manganese mapping of the portion corresponding to the image of FIG. 12.
Figure 15:
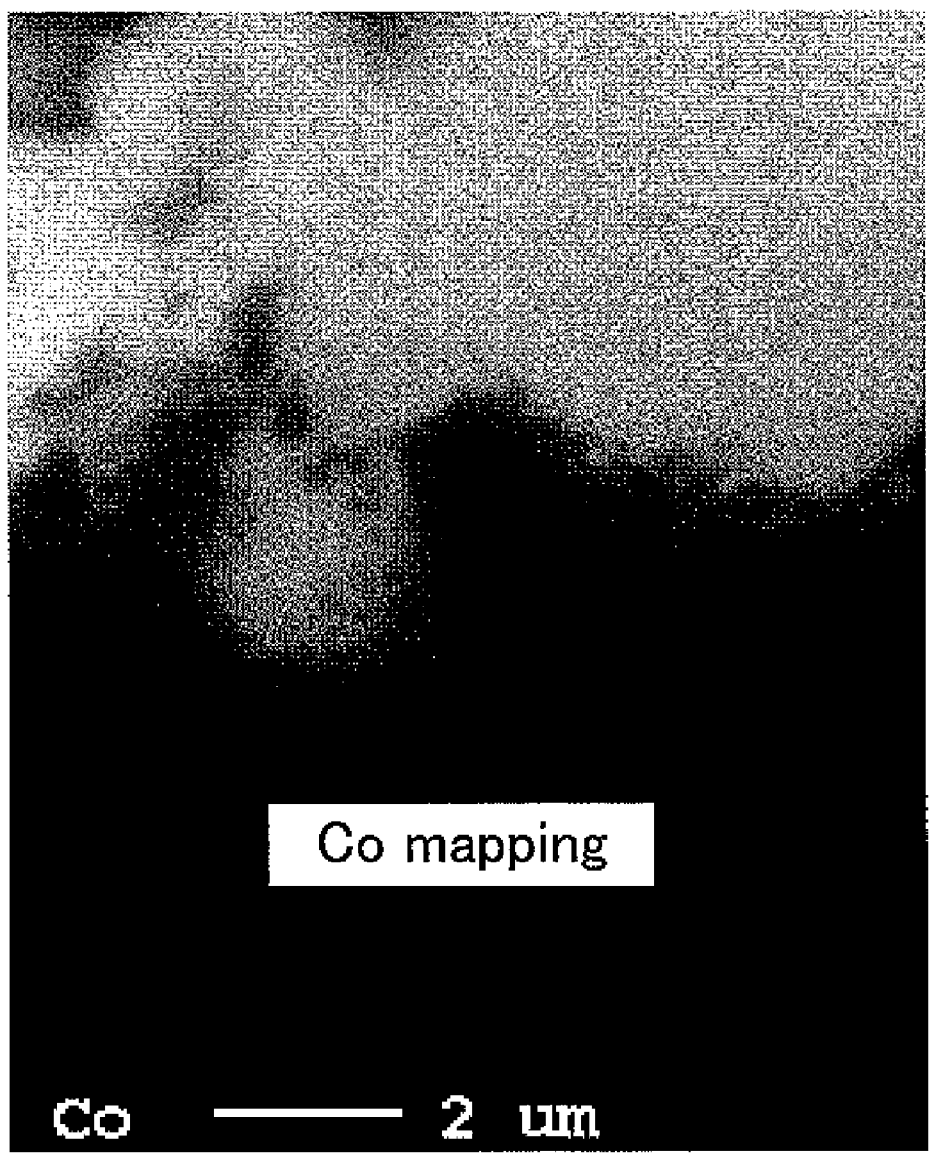
FIG. 15 is an image showing the results of cobalt mapping of the portion corresponding to the image of FIG. 12.
Figure 16:
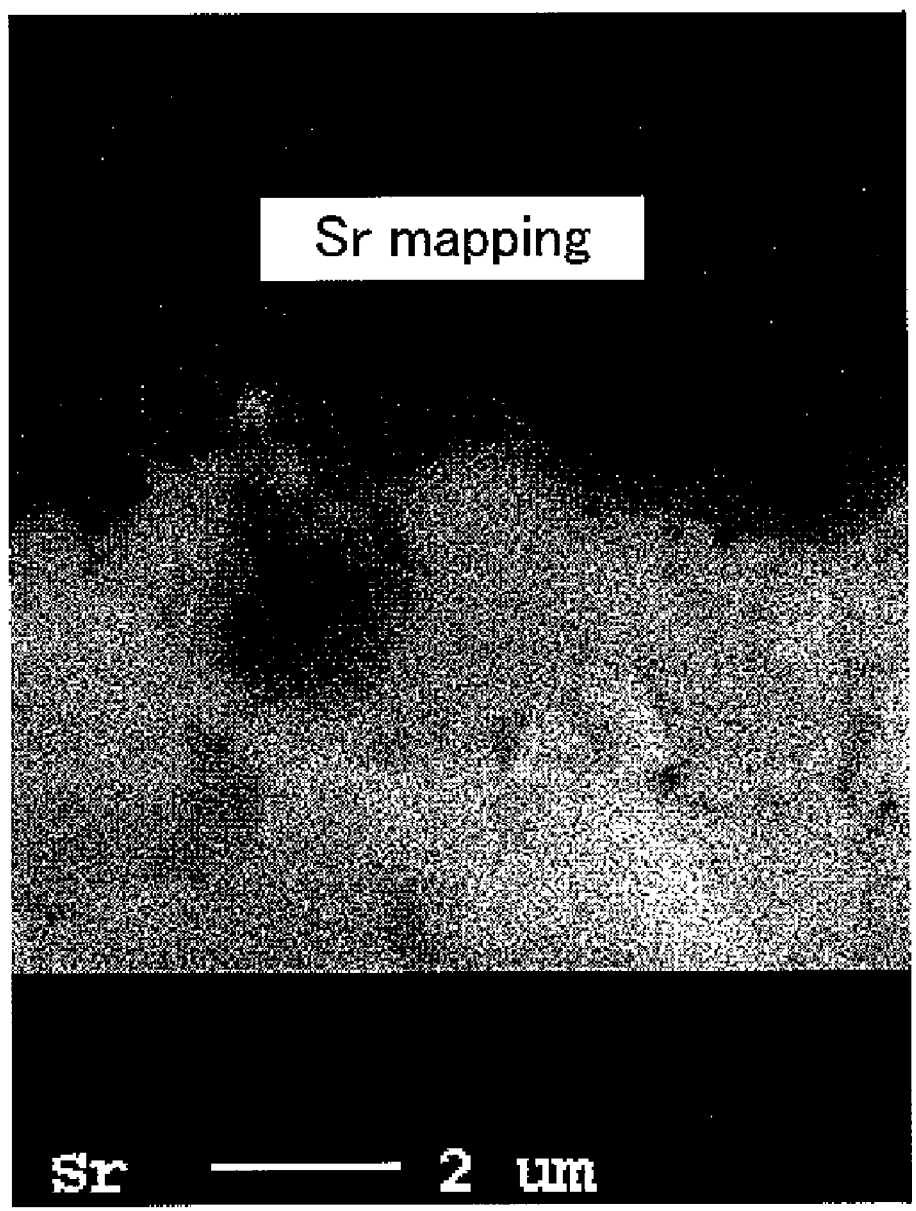
FIG. 16 is an image showing the results of strontium mapping of the portion corresponding to the image of FIG. 12.
Figure 17:
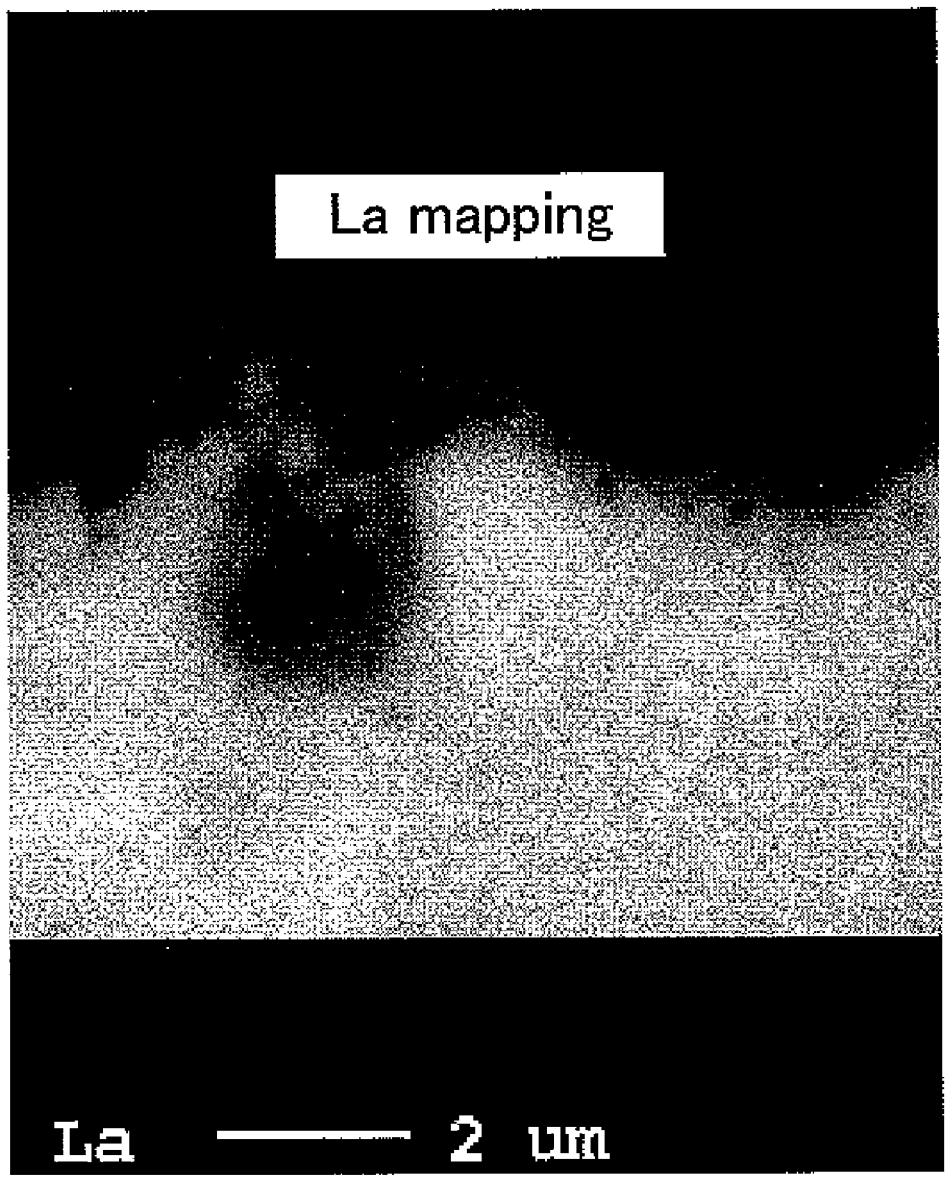
FIG. 17 is an image showing the results of lanthanum mapping of the portion corresponding to the image of FIG. 12.

FIG. 12 shows a portion of the image of FIG. 11 including the reaction phase (see circle). The portion corresponding to the image of FIG. 12 was subjected to elemental analysis (elemental mapping). FIGS. 13 to 17 respectively show the results of O (oxygen) mapping, Mn (manganese) mapping, Co (cobalt) mapping, Sr (strontium) mapping, and La (lanthanum) mapping. In FIGS. 13 to 17, the brightness of each image varies depending on element concentration; specifically, the brighter (whiter) the image, the higher the element concentration, and the darker (blacker) the image, the lower the element concentration. These images and the results of analysis thereof were obtained by means of a field emission electron probe microanalyzer (JXA-8500F, product of JEOL Ltd.).

As is clear from FIGS. 13 to 17, the reaction phase contains Co in addition to La, Sr, and Mn. That is, some of Co atoms contained in the bonding layer ($MnCo_2O_4$) enter the LSM phase (the bonding portion on the side of the LSM phase, and the interior of the LSM phase). Conceivably, this phenomenon occurs during thermal treatment at 850° C. of the aforementioned "bonding paste" provided between the interconnector 200 and the air electrode 140 (the base layer 141+the outer layer 142) which has been thermally treated at 1,000° C.

In contrast, as is clear from FIGS. 8 and 9, in the first embodiment, there does not occur a phenomenon that some of Co atoms contained in the bonding layer ($MnCo_2O_4$) enter the LSM phase. Therefore, conceivably, "phenomenon that some of Co atoms contained in the bonding layer ($MnCo_2O_4$) enter the bonding portion on the side of the LSM phase" greatly contributes to the fact that the bonding strength between the air electrode 140 and the bonding layer 300 is higher in the second embodiment than in the first embodiment. Also, conceivably, "phenomenon that some of Co atoms contained in the bonding layer ($MnCo_2O_4$) enter the interior of the LSM phase" contributes to an increase in strength of the LSM phase itself.

As described above, when the air electrode 140 (i.e., first conductive connection member) is bonded to the interconnector 200 (i.e., second conductive connection member, corresponding to the conductive connection member of the present invention) by means of the bonding layer 300 containing a transition metal oxide having a spinel-type crystal structure (e.g., $MnCo_2O_4$ or $CuMn_2O_4$), in the case where the air electrode has the outer layer 142 (e.g., LSM or LM) having an Mn-containing perovskite structure (see the second embodiment (FIG. 5)), the bonding strength between the air electrode 140 and the bonding layer 300 is higher, as compared with the case where the air electrode does not have the outer layer 142 (see the first embodiment (FIG. 4)).

Figure 18:
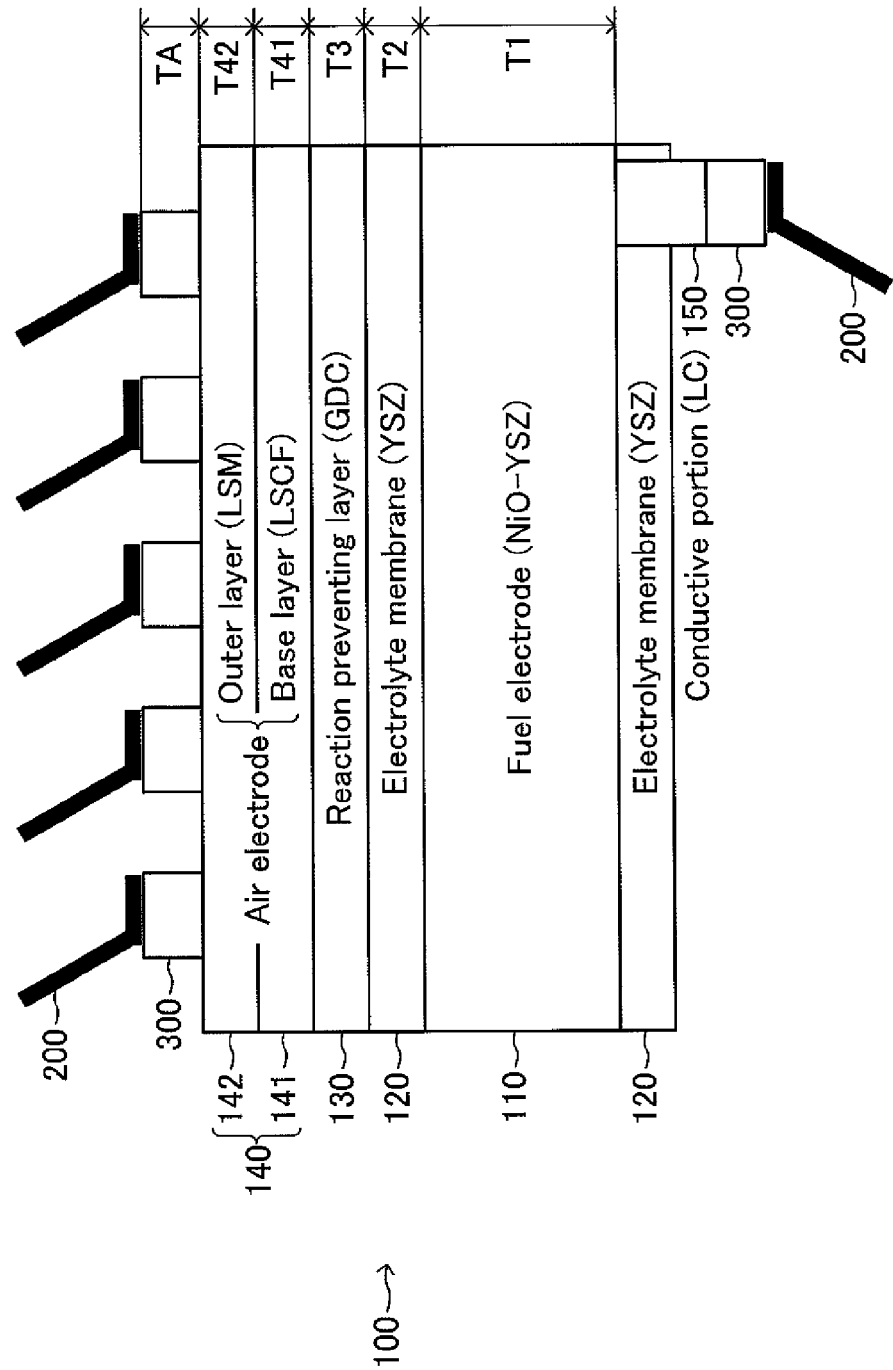
FIG. 18 is a schematic representation of the state where an LC-containing conductive portion fixed to a fuel electrode is bonded to an interconnector by means of a bonding layer, which conductive portion does not have an outer layer formed of LSM.
Figure 19:
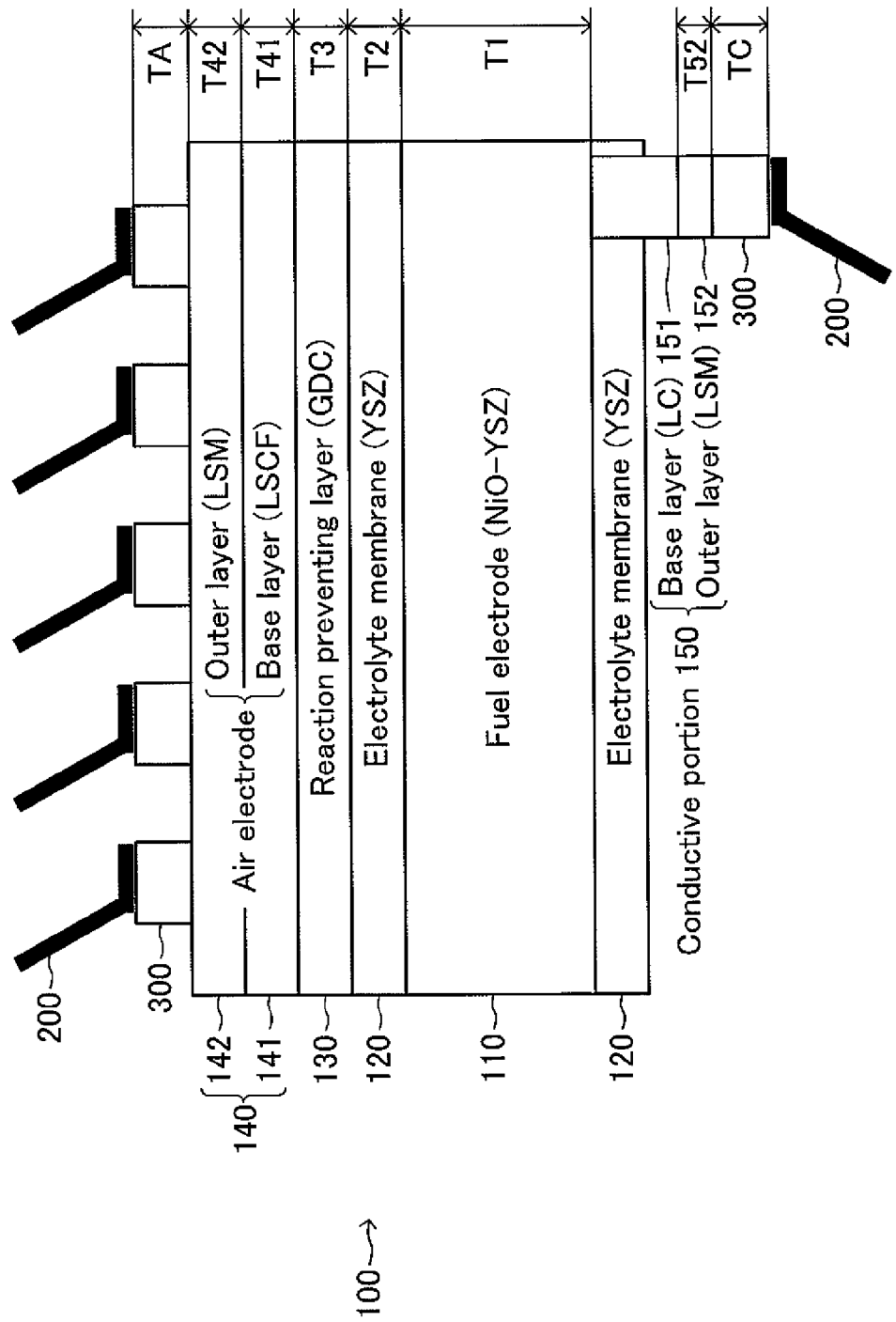
FIG. 19 is a schematic representation of the state where an LC-containing conductive portion fixed to a fuel electrode is bonded to an interconnector by means of a bonding layer, which conductive portion has an outer layer formed of LSM.

As has also been revealed, similar effects are obtained in the case shown in FIGS. 18 and 19; i.e., in the case where a conductive portion 150 (terminal electrode, corresponding to the aforementioned first conductive connection member) containing lanthanum chromite (LC) and fixed and electrically connected to the fuel electrode 110 is bonded to the interconnector 200 (i.e., second conductive connection member, corresponding to the conductive connection member of the present invention) by means of the bonding layer 300 containing a transition metal oxide having a spinel-type crystal structure (e.g., $MnCo_2O_4$ or $CuMn_2O_4$).

Specifically, it has been revealed that, as compared with the case shown in FIG. 18 (i.e., in the case where the conductive portion 150 is formed only of an LC layer, and the LC layer is bonded to the interconnector 200 by means of the bonding layer 300), the bonding strength between the conductive portion 150 and the bonding layer 300 is higher in the case shown in FIG. 19 (i.e., in the case where the conductive portion 150 is formed of the following two layers: a base layer 151 (LC layer) and an outer layer 152 (e.g., LSM layer or LM layer) having an Mn-containing perovskite structure, and the outer layer 152 (e.g., LSM layer or LM layer) is bonded to the interconnector 200 by means of the bonding layer 300). As has also been revealed, in this case, the thickness T52 of the outer layer 152 is preferably 5 to 50 μm, and the thickness TC of the bonding layer is preferably 20 to 500 μm, from the viewpoint of securement of tensile strength.

Lanthanum chromite (LC) is represented by the following chemical formula (5):

$$La_{1-x}AE_xCr_{1-y+z}B_yO_{3-\delta} \qquad (5).$$

(wherein AE is at least one element selected from among Ca, Sr, and Ba; B is at least one element selected from among Co, Ni, V, Mg, and Al; x is 0 to 0.4, more preferably 0.05 to 0.2; y is 0 to 0.3, more preferably 0.02 to 0.22; z is 0 to 0.1, more preferably 0.02 to 0.05; and δ is a small value (including zero)).

As shown in FIGS. 18 and 19, LC is employed in the terminal electrode provided on the side of the fuel electrode, for the reason that one side (inside) of the terminal electrode is exposed to a reducing atmosphere, and the other side (outside) thereof is exposed to an oxidizing atmosphere. At present, LC is the most stable conductive ceramic material both in oxidizing and reducing atmospheres.

As described above, generally, when a first conductive connection member is bonded to a second conductive connection member by means of a bonding layer containing a transition metal oxide having a spinel-type crystal structure (e.g., $MnCo_2O_4$ or $CuMn_2O_4$), in the case where the first conductive connection member has an outer layer (e.g., LSM layer or LM layer) having an Mn-containing perovskite structure, regardless of the material of (the base layer) of the first conductive connection member, the bonding strength between the first conductive connection member and the bonding layer is higher, as compared with the case where the first conductive connection member does not have such an outer layer.

What is claimed is:

1. An electrochemical device comprising:
a unit cell of a solid oxide fuel cell including a solid electrolyte membrane, a fuel electrode which is integral with the solid electrolyte membrane and which comes into contact with a fuel gas for allowing reaction of the fuel gas to proceed, and an air electrode which is integral with the solid electrolyte membrane and which comes into contact with an oxygen-containing gas for allowing reaction of the oxygen-containing gas to proceed;
a conductive connection member; and
a bonding layer for bonding and electrically connecting the air electrode to the conductive connection member, wherein the bonding layer contains a transition metal oxide having a spinel-type crystal structure, and the air electrode includes an outer layer which is bonded to the bonding layer and which has a manganese-containing perovskite structure,
wherein the air electrode includes, in addition to the outer layer, a base layer formed of lanthanum strontium cobalt ferrite represented by the chemical formula $La_{1-x}Sr_xCo_{1-y}Fe_yO_3$ (x: 0.2 to 0.5, y: 0.6 to 0.85).

2. An electrochemical device comprising:
a unit cell of a solid oxide fuel cell including a solid electrolyte membrane, a fuel electrode which is integral with the solid electrolyte membrane and which comes into contact with a fuel gas for allowing reaction of the fuel gas to proceed, and an air electrode which is integral with the solid electrolyte membrane and which comes into contact with an oxygen-containing gas for allowing reaction of the oxygen-containing gas to proceed;
a conductive connection member; and
a bonding layer for bonding and electrically connecting the conductive connection member to a conductive portion which is fixed and electrically connected to the fuel electrode and which is formed of lanthanum chromite represented by the chemical formula $La_{1-x}Ca_xCr_{1-y+z}B_yO_3$ (B: at least one element selected from among Co, Ni, and Al, x: 0.05 to 0.2, y: 0.02 to 0.22, z: 0.02 to 0.05), wherein the bonding layer contains a transition metal oxide having a spinel-type crystal structure, and the conductive portion includes an outer layer which is bonded to the bonding layer and which has a manganese-containing perovskite structure.

3. An electrochemical device according to claim 1, wherein the outer layer is formed of lanthanum strontium manganite represented by the chemical formula $La_{1-x}Sr_xMnO_3$ (x: 0.1 to 0.3).

4. An electrochemical device according to claim 1, wherein the outer layer has a thickness of 5 to 50 μm.

5. An electrochemical device according to claim 1, wherein the bonding layer contains one of $MnCo_2O_4$ and $CuMn_2O_4$.

6. An electrochemical device according to claim 1, wherein the bonding layer provided between the outer layer and the second conductive connection member has a thickness of 20 to 500 μm.

7. An electrochemical device according to claim 1, wherein the outer layer is formed of lanthanum strontium manganite represented by the chemical formula $La_{1-x}Sr_xMnO_3$ (x: 0.1 to 0.3); the bonding layer contains $MnCo_2O_4$; and a bonding portion between the outer layer and the bonding layer has, on a side of the outer layer, a portion containing La, Sr, Mn, and Co.

* * * * *